US012669604B2

(12) United States Patent
Delude et al.

(10) Patent No.: US 12,669,604 B2
(45) Date of Patent: Jun. 30, 2026

(54) LOW DIMENSIONAL ENCODING BROADBAND BEAMFORMER WITH REDUCED HARDWARE ARRAYS

(71) Applicant: GEORGIA TECH RESEARCH CORPORATION, Atlanta, GA (US)

(72) Inventors: Coleman Delude, Atlanta, GA (US); Justin Romberg, Atlanta, GA (US); Mark Davenport, Atlanta, GA (US); Santhosh Karnik, Atlanta, GA (US); Rakshith Sharma Srinivasa, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 267 days.

(21) Appl. No.: 18/270,145

(22) PCT Filed: Jan. 4, 2022

(86) PCT No.: PCT/US2022/011063
§ 371 (c)(1),
(2) Date: Jun. 28, 2023

(87) PCT Pub. No.: WO2022/197346
PCT Pub. Date: Sep. 22, 2022

(65) Prior Publication Data
US 2024/0077598 A1 Mar. 7, 2024

Related U.S. Application Data

(60) Provisional application No. 63/133,533, filed on Jan. 4, 2021.

(51) Int. Cl.
*G01S 15/89* (2006.01)
*G01S 7/28* (2006.01)
*G01S 13/42* (2006.01)

(52) U.S. Cl.
CPC ........ *G01S 15/8954* (2013.01); *G01S 7/2813* (2013.01); *G01S 13/426* (2013.01)

(58) Field of Classification Search
None
See application file for complete search history.

(56) References Cited

U.S. PATENT DOCUMENTS 7,096,051 B1 8/2006 Alder
7,511,643 B2 3/2009 Baraniuk et al.
(Continued)

OTHER PUBLICATIONS

Ahmed et al., "A survey on hybrid beamforming techniques in 5G: Architecture and system model perspectives." IEEE Communications Surveys & Tutorials 20.4 (2018): 3060-3097.
(Continued)

*Primary Examiner* — Robert W Hodge
*Assistant Examiner* — Brandon James Henson
(74) *Attorney, Agent, or Firm* — Meunier Carlin & Curfman LLC

(57) ABSTRACT

A beamforming system and method is disclosed comprising a hybrid multi-measurement unit or process that can encode or embed broadband signals in a low dimensional encoding subspace such as a Slepian subspace. The direction-of-arrival of the plane wave signals, encoded with the low dimensional embedding, can be used to provide a spatially sampled signal to a front-end mixed-signal circuitries substantially reduced hardware for beamforming systems. The beamforming array has a finite array aperture to which a temporal snapshot of the signal can be acquired and then processed as a set of samples from a time-limited bandlimited sequence.

27 Claims, 18 Drawing Sheets

(56) References Cited

U.S. PATENT DOCUMENTS

| | | | | |
|---|---|---|---|---|
| 7,898,477 | B1 * | 3/2011 | Oxley | H01Q 3/2658 |
| | | | | 342/447 |
| 10,148,360 | B2 | 12/2018 | Ashrafi | |
| 2006/0153319 | A1 | 7/2006 | Gorsuch | |
| 2007/0285315 | A1 | 12/2007 | Davis | |
| 2009/0066727 | A1 | 3/2009 | Lu | |
| 2016/0261330 | A1 | 9/2016 | Woodsum | |
| 2018/0131102 | A1 * | 5/2018 | Wang | H01Q 3/38 |

OTHER PUBLICATIONS

Ali et al., "Beamforming techniques for massive MIMO systems in 5G: overview, classification, and trends for future research." Frontiers of Information Technology & Electronic Engineering 18 (2017): 753-772.

Anderson, Sören, "Optimal dimension reduction for sensor array signal processing." Conference Record of the Twenty-Fifth Asilomar Conference on Signals, Systems Computers, vol. 2 (1991): 918-922.

Ardah et al., "A unifying design of hybrid beamforming architectures employing phase shifters or switches." IEEE Transactions on Vehicular Technology 67.11 (2018): 11243-11247.

Bogale et al., "On the number of RF chains and phase shifters, and scheduling design with hybrid analog-digital beamforming." IEEE Transactions on Wireless Communications 15.5 (2016): 1-37.

Bonami et al., "Non-asymptotic behavior of the spectrum of the sinc-kernel operator and related applications." Journal of Mathematical Physics 62.3 (2021): 1-22.

Boulsane et al., "Discrete prolate spheroidal wave functions: Further spectral analysis and some related applications." Journal of Scientific Computing 82.3 (2019): 1-19.

Buckley et al., "Broad-band signal-subspace spatial-spectrum (BASS-ALE) estimation." IEEE Transactions on Acoustics, Speech, and Signal Processing 36.7 (1988): 953-964.

Buckley et al., "Eigenstructure based broadband source location estimation." ICASSP'86. IEEE International Conference on Acoustics, Speech, and Signal Processing. vol. 11. IEEE (1986): 1869-1872.

Buckley, K., "Spatial/spectral filtering with linearly constrained minimum variance beamformers." IEEE Transactions on Acoustics, Speech, and Signal Processing 35.3 (1987): 249-266.

Chen et al., "Hybrid beamforming for broadband millimeter wave massive MIMO systems." 2018 IEEE 87th Vehicular Technology Conference (VTC Spring). IEEE (2018): 1-5.

El Ayach et al., "Spatially sparse precoding in millimeter wave MIMO systems." IEEE transactions on wireless communications 13.3 (2014): 1499-1513.

Jang et al., "A 1-GHz 16-element four-beam true-time-delay digital beamformer." IEEE Journal of Solid-State Circuits 54.5 (2019): 1-11.

Jung et al., "A wideband true-time-delay phase shifter with 100% fractional bandwidth using 28 nm CMOS." 2020 IEEE Radio Frequency Integrated Circuits Symposium (RFIC). IEEE (2020): 59-62.

Karnik et al., "Bandlimited signal reconstruction from nonuniform samples." Proceedings of the Workshop on Signal Processing with Adaptive Sparse Structured Representations (SPARS). 2019: 1-6.

Karnik et al., "Improved bounds for the eigenvalues of prolate spheroidal wave functions and discrete prolate spheroidal sequences." Applied and Computational Harmonic Analysis 55 (2020): 1-29.

Karnik et al., "The fast Slepian transform." Applied and Computational Harmonic Analysis 46.3 (2017): 624-652.

Keiner et al., "Using NFFT 3—a software library for various nonequispaced fast Fourier transforms." ACM Transactions on Mathematical Software (TOMS) 36.4 (2009): 1-24.

Krim et al., "Two decades of array signal processing research: the parametric approach." IEEE signal processing magazine 13.4 (1996): 67-94.

Mo et al., "Design of spectrally shaped binary sequences via randomized convex relaxations." 2015 49th Asilomar Conference on Signals, Systems and Computers. IEEE (2015): 1-5.

Morsali et al., "Achieving fully-digital performance by hybrid analog/digital beamforming in wide-band massive-MIMO systems." ICASSP 2020-2020 IEEE International Conference on Acoustics, Speech and Signal Processing (ICASSP). IEEE (2020): 5125-5129.

Peng et al., "Robust wide-beam analog beamforming with inaccurate channel angular information." IEEE Communications Letters 22.3 (2018): 638-641.

Slepian, D., "On bandwidth." Proceedings of the IEEE 64.3 (1976): 292-300.

Slepian, D., "Prolate spheroidal wave functions, Fourier analysis, and uncertainty—V: The discrete case." Bell System Technical Journal 57.5 (1978): 1371-1430.

Sohrabi et al., "Hybrid digital and analog beamforming design for large-scale antenna arrays." IEEE Journal of Selected Topics in Signal Processing 10.3 (2016): 1-13.

Spielman et al., "Performance analysis of the MUSIC algorithm." ICASSP'86. IEEE International Conference on Acoustics, Speech, and Signal Processing. vol. 11. IEEE (1986): 1909-1912.

Spoof et al., "True-time-delay beamforming receiver with RF re-sampling." IEEE Transactions on Circuits and Systems I: Regular Papers 67.12 (2020): 1-14.

Venugopal et al., "Channel estimation for hybrid architecture-based wideband millimeter wave systems." IEEE Journal on Selected Areas in Communications 35.9 (2017): 1996-2009.

Xu et al., "Reduced-dimension beam-space broad-band source localization: preprocessor design and evaluation." Fourth annual ASSP workshop on spectrum estimation and modeling. IEEE (1988): 22-27.

Zatman, M., "How narrow is narrowband?." IEE Proceedings-Radar, Sonar and Navigation 145.2 (1998): 85-91.

Zhu et al., "A novel hybrid beamforming algorithm with unified analog beamforming by subspace construction based on partial CSI for massive MIMO-OFDM systems." IEEE Transactions on Communications 65.2 (2017): 1-35.

International Search Report and Written Opinion received in PCT/US2022/011063 mailed Dec. 6, 2022.

* cited by examiner $$f_s = \frac{1}{2\Omega}$$

$$f_s = \frac{Ae}{c}$$

LOW DIMENSIONAL ENCODING BROADBAND BEAMFORMER WITH REDUCED HARDWARE ARRAYS

RELATED APPLICATION

This application is a 371 national stage entry of PCT application PCT/US2022/011063, filed Jan. 4, 2022, which claims priority to, and the benefit of, U.S. Provisional Patent Application No. 63/133,533, filed Jan. 4, 2021, entitled "Low Dimensional Encoding Broadband Beamformer for Reduced Hardware Arrays," both of which are incorporated by reference herein in their entireties.

TECHNICAL FIELD

The present disclosure generally relates to methods and systems for performing beamforming, specifically, low dimensional encoding broadband beamforming, e.g., for communication, radar, or sonar systems.

BACKGROUND

Beamforming is a process that exploits the redundancies in a communication or sensing system by acquiring a signal using a multi-sensor array. In more advanced array-based wireless communications, RADAR, and acoustic systems, as well as medical systems, the technical demands for higher bandwidth signals are increasing that are making conventional implementation for broadband beamforming systems impractical by size and cost.

Conventional broadband beamforming system employs fully digital or true time delays circuitries that employs individual analog-to-digital conversion circuits, and time shifting and summing circuitries, for each of the array elements that couples the array to the digital signal processing unit to increase the signal-to-noise ratio of the acquired signal or to separate two signals with distinct direction-of-arrivals (DOAs). To this end, as the number of array elements increases for beamforming applications, so does the number of analog-to-digital conversions increase for each digital beamforming element and signal adjustment circuitries increase for true-time delay circuits in the front end mixed-signal circuitries.

There is a benefit to reducing the hardware and complexity of front-end mixed-signal circuitries for beamforming systems.

SUMMARY

A beamforming system and method are disclosed comprising a hybrid multi-measurement unit or process that can encode or embed broadband signals in a low dimensional subspace such as a Slepian subspace, among others as described herein. The direction-of-arrival of the plane wave signals, encoded with the low dimensional embedding, can be used to provide a spatially sampled signal to a front-end mixed-signal circuitries substantially reduced hardware for beamforming systems. The beamforming array has a finite array aperture to capture and to spatially sample the signal to produce a temporal snapshot of the signal which can then be processed as a set of samples from a time-limited bandlimited sequence.

In some embodiments, a robust Slepian subspace-based embedding is used to perform broadband beamforming. The hardware can be employed with a fast Slepian operation and temporal decimation operation to further reduce hardware complexity and/or reduce computational cost.

In an aspect, a system is disclosed comprising a broadband receiver comprising an array of beamforming receiving elements, wherein the array of beamforming receiving elements is configured to receive a plane wave to provide a plurality of input signals corresponding to a number of receiving elements of the array; a demodulation unit coupled to the broadband receiver, the demodulation unit comprising a plurality of measurement modules, including a first measurement module and a second measurement module, wherein each module is coupled to two or more receiving elements of the array to receive corresponding input signals, wherein the first measurement module and a second measurement module respectively defines an aperture of the array at a first projection and a second projection of the plane wave and includes a set of the phase and magnitude varying elements configured to apply an effective complex weight associated with the projection; and a set of combiner units, including a first combiner unit and a second combiner unit, wherein each of the set of combiner units are coupled to outputs of a respective module of the plurality of measurement modules, and wherein the first combiner unit is coupled to outputs of the first measurement module and the second combiner unit is coupled to outputs of the second measurement module.

In some embodiments, the system further includes a set of analog-to-digital converters, wherein the number of the plurality of measurement modules corresponds to the number of the set of analog-to-digital converters, and wherein the number of analog-to-digital converters is less than the number of receiving elements, e.g., less than 50%, less than 25%, less than 5%, less than 1%, is k, k+1, k+2, etc., in which k is the number of coefficient channels and recited percentage can be interpreted as the percentage of the number of coefficient channels to the number of M array elements.

In some embodiments, the first measurement module is successively coupled to the second measurement module.

In some embodiments, the first measurement module and the second measurement module are coupled to one another in a parallel configuration.

In some embodiments, the first measurement module is coupled to each of the receiving elements of the array.

In some embodiments, the first measurement module is coupled to a subset of the receiving elements of the array.

In some embodiments, outputs of the set of combiner units are operatively coupled to a respective analog-to-digital converter, wherein a first output of the first combiner unit is coupled to a first analog-to-digital converter and a second output of the second combiner unit is coupled to a second analog-to-digital converter.

In some embodiments, the set of the phase and magnitude varying elements apply the effective complex weight associated with the projection using modulation weights derived from sampled prolate spheroidal wave functions.

In some embodiments, the set of the phase and magnitude varying elements apply the effective complex weight associated with the projection using modulation weights that are unimodular or are restricted to be members of a set with finite cardinality.

In some embodiments, the array of beamforming receiving elements is configured as a 2D or a 3D array.

In some embodiments, the elements of the array are disposed on a conformal 3D structure (e.g., dome, cone).

In some embodiments, the elements of the array are configured in a grid pattern, a circular or oval-shaped pattern, or an unstructured pattern.

In some embodiments, the first combiner unit comprises a summing circuit that connects to outputs of the first set of phase and magnitude varying elements.

In some embodiments, the set of the phase and magnitude varying elements comprises at least one of a phase shifter circuit, a polarity inverter circuit, or an amplifier circuit.

In some embodiments, the system further includes a processor coupled to outputs of the set of analog-to-digital converters to receive sampled ADC values, wherein the processor is configured to reconstruct a transmitted signal using the sampled ADC values.

In some embodiments, the ADCs are configured to temporally sample values at a decimation rate prior to reconstructing the transmitted bandlimited signal, wherein the temporally sampled ADC values have a fixed or variable sampling rate lower than the Nyquist rate.

In some embodiments, the processor is configured to perform fast Slepian computation to reconstruct the transmitted signal (e.g., at the Nyquist rate).

In some embodiments, the system further includes a processor coupled to outputs of the set of analog-to-digital converters to receive sampled ADC values, wherein the processor is configured to determine a direction of arrival (DOA) of the plane wave using the sampled ADC values.

In some embodiments, the system further includes a processor coupled to outputs of the set of analog-to-digital converters to receive sampled ADC values, wherein the processor is configured to classify a signal type of a transmitted bandlimited signal using the sampled ADC values.

In some embodiments, the system further includes a processor coupled to outputs of the set of analog-to-digital converters to receive sampled ADC values, wherein the processor is configured to decode communication symbols encoded in a transmitted bandlimited signal using the sampled ADC values.

In another aspect, a system is disclosed comprising a broadband transmitter comprising an array of beamforming transmitting elements, wherein the array of beamforming transmitting elements is configured to receive a plurality of signals corresponding to a number of transmitting elements to transmit a plane wave; a low-dimensional encoding broadband beamformer unit, the low-dimensional encoding broadband beamformer unit being coupled to the broadband transmitter, the low-dimensional encoding broadband beamformer unit comprising a plurality of beamforming modules, including a first beamforming module and a second beamforming module, wherein each beamforming module is configured to create a projection of the plane wave and includes a phase and magnitude varying elements to apply an effective complex weight associated with the projection, and wherein the set of the phase and magnitude varying elements are coupled to each transmitting element of the array of beamforming transmitting elements; and a plurality of digital-to-analog converters each coupled to each beamforming module of the plurality of beamforming modules.

In some embodiments, each beamforming module is configured to encode a coefficient channel associated with a measurement basis function.

In some embodiments, the measurement basis function is associated with a set of prolate spheroidal wave functions, a set of DFT functions, or a set of binary functions.

In some embodiments, the number of the plurality of beamforming modules corresponds to the number of the plurality of digital-to-analog converters, and wherein the number of the plurality of digital-to-analog converters is less than the number of receiving elements, e.g., less than 50%, less than 25%, less than 5%, less than 1%, is k, k+1, k+2, etc., in which k is described above.

In some embodiments, the broadband transmitter is configured to operate with any of the above-recited systems.

In another aspect, a method is disclosed comprising receiving a set of low dimensional encoded broadband signals as a plane wave at a broadband array receiver comprising a number of receiving elements to provide a plurality of spatially sampled signals corresponding to the number of receiving elements; decoding the plurality of spatially sampled signals at each of a plurality of measurement modules by applying different effective complex weights to the spatially sampled signals, wherein the complex weights at each measurement module are associated with a given projection of the plane wave as incident on the broadband array; and reconstructing a source signal based on the decoding.

In some embodiments, the method further includes performing operations for any of the above-discussed systems.

BRIEF DESCRIPTION OF THE DRAWINGS

The skilled person in the art will understand that the drawings, described below, are for illustration purposes only.

DETAILED SPECIFICATION

Each and every feature described herein, and each and every combination of two or more of such features is included within the scope of the present invention provided that the features included in such a combination are not mutually inconsistent.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. All references cited and discussed in this specification are incorporated herein by reference in their entireties and to the same extent as if each reference was individually incorporated by reference.

The theory of Slepian spaces provides that time-limited bandlimited signals lie in a known low-dimensional subspace. Based on the theory of Discrete Prolate Spheroidal Sequences (DPSS) ("Slepian basis"), among others, the exemplary method and system are able to employ a subspace that is low dimensional, with dimension well approximated using a time-bandwidth product. Notably, the exemplary encoding can produce a digital representation close to that achieved in fully digital beamforming using greatly hardware circuitries. The low-dimensional nature of the encoding means that the reduction is drastic in many, if not all, practical use scenarios. Furthermore, since each measurement is acquired using well-established hardware elements such as amplifiers and phase-shifters, the increase in hardware complexity in comparison to narrowband systems is minimal. Therefore, the exemplary method does not suffer from the shortcomings of digital- or true-time delay beamformers with essentially no loss in performance.

Example Low Dimensional Encoding Broadband Beamformer System

Figure 1:
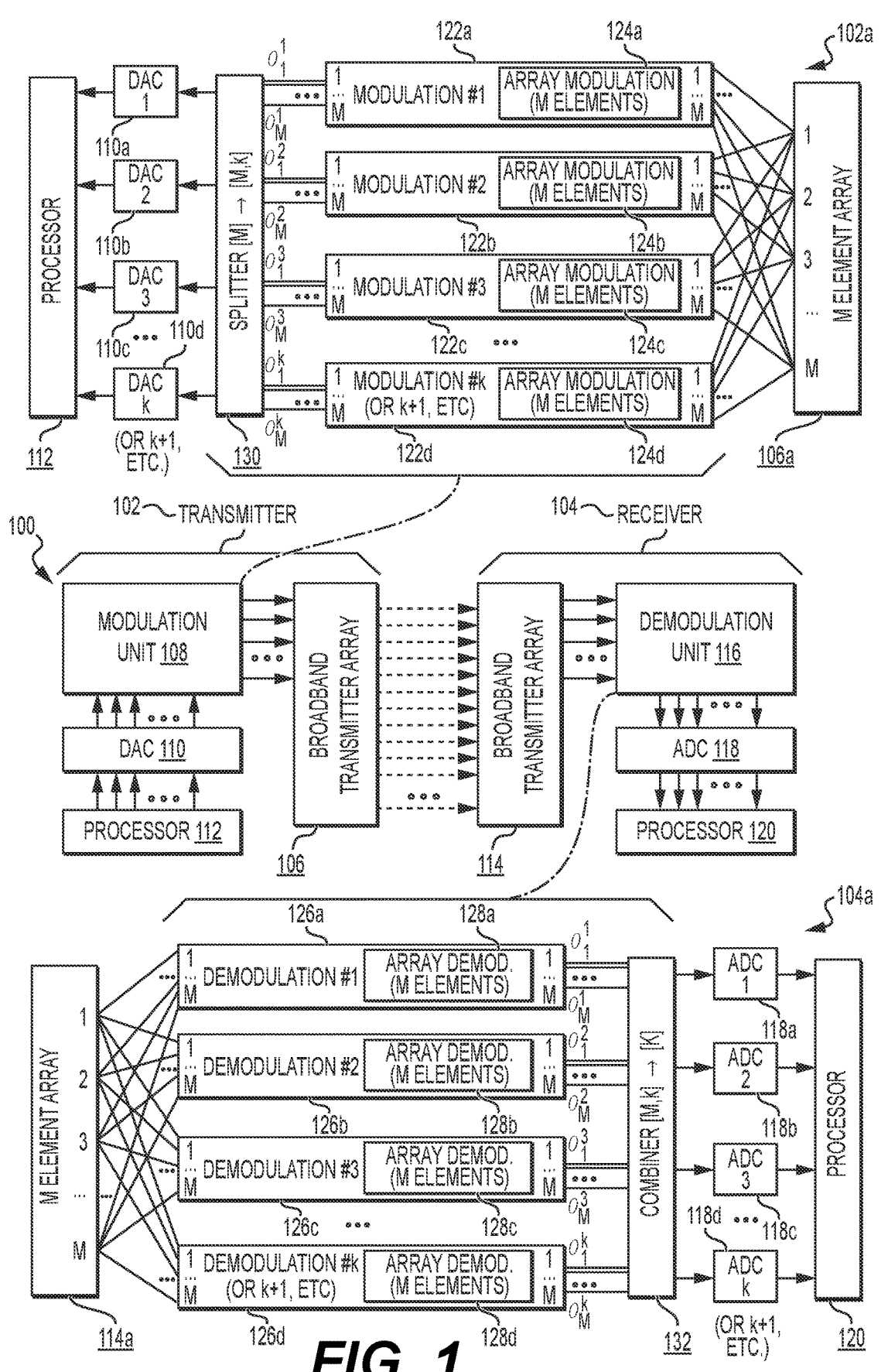
FIG. 1 shows an example low dimensional encoding broadband beamformer system having an array transmitter and an array receiver in accordance with an illustrative embodiment.

FIG. 1 is a diagram of a low dimensional encoding broadband beamformer system 100 (e.g., for a MIMO communication network, a RADAR system, a SONAR system) comprising a transmitter 102 (also shown as 102*a*) and a receiver 104 (also shown as 104*a*).

Transmitter 102 includes a broadband transmitter array 106 that is coupled to a low-dimensional encoding broadband beamformer unit 108 (shown as "Modulation Unit" 108) in which the modulation unit 108 is coupled to a digital-to-analog stage 110 (shown as "DAC" 110) that then interfaces to a processing unit 112 (shown as "Processor" 112). The transmitter 102 can encode the signals of the array element as a plane wave in a set of coefficient channels according to a measurement basis, e.g., the prolate spheroidal wave functions ("Slepian basis"), Discrete Fourier Transform (DFT) basis, Binary basis, Random basis ("Gaussian"), using a set of modulation modules (e.g., stages or branches) in which the signal information is embedded within subspace, e.g., bandwidths, array apertures, and angles of arrival, that can be subsequently reconstructed by spatially sampling the signals across the array. The encoding by a measurement basis function generates a set of coefficients that are transmitted through a substantially fewer number of channels to which the signals can be reconstructed.

Receiver 104 includes a broadband receiver array 114 that is coupled to a demodulation unit 116. The demodulation unit 116 is coupled to an analog-to-digital stage 118 that interfaces to a processing unit 120 (shown as "Processor" 120). The receiver 104 can decode the plane wave received at its array elements according to the same measurement basis, e.g., the prolate spheroidal wave functions or some other basis function described herein, using a set of demodulation modules (e.g., stages or branches) to measure the plane wave at different bandwidths, array apertures, and angles of arrival. For communication systems, the same measurement basis functions are preferred. In SONAR or RADAR, where the source can be arbitrary, the measurement basis functions do not have to be the same as the modeled channel or system.

The transmitter 102 and receiver 104 in embedding the information in an embedding subspace such as bandwidths, array apertures, and angles of arrival can be implemented using substantially fewer number of transmission and reception channels (also referred to herein as "coefficient channels") as compared to conventional beamforming transmission and reception systems. The number of coefficient channels is optimally a number k (that is substantially less than the number of antenna elements) that corresponds to the dimensionality of the subspace, e.g., as defined per Equations 5 or 7 below. The number of coefficient channels can be increased (e.g., k+1, k+2, k+3, etc.) or decreased (e.g., k−1, k−2, k−3, etc.) from the baseline k as, e.g., defined by Equation 5 or 7, for example, for a given application. For example, in communication applications in which higher fidelity signals are required, the number of k channels can be increased to k+1, k+2, or k+3, etc. The number of coefficient channels can be between any number k and the number of receiving elements.

While the number of channels in the transmitter and the receiver in the example of FIG. 1 is the same, the number of channels at the transmitters and at the receiver do not need to match. For a k-channel system or k+1 channel system, etc., at the transmitter, the receiver can have the same or lower number of channels (e.g., k, k+1, etc.). Generally, the receiver can have any number of channels and will experience benefit up to the same number of channels as the transmitter. A receiver with a higher number of channels than that of the transmitter would still work, though it would not necessarily benefit from the additional channel.

In the example shown in FIG. 1, the transmitter 102 (shown as 102*a*) may include, in the modulation unit 108, k number of modulation modules (stages or branches) 122 (shown as "Modulation #1" 122*a*, "Modulation #2" 122*b*, "Modulation #3" 122*c*, and "Modulation #k" 122*d*) that respectively connect to k number of DAC channels 110 (shown as "DAC 1" 110*a*, "DAC 2" 110*b*, "DAC 3" 110*c*, and "DAC k" 110*d*) in which k is substantially smaller than the number of channels, M, e.g., in an $M_x \times M_y$ or other array configuration as described herein, of a transmitter array 106 (show as 106*a*). Each modulation module (stage or branch) (e.g., 122*a*, 122*b*, 122*c*, 122*d*) includes M number of array modulation operators 124 (shown as 124*a*, 124*b*, 124*c*, 124*d*) and connects at its inputs (shown having inputs "1 . . . M") to each of the DAC channels (e.g., 110*a*, 110*b*, 110*c*, 110*d*) through a splitter circuit 130, and connects at its outputs (shown having outputs "1 . . . M") to each of the elements of the array 106*a*. As one example, a 4096 M-element array (having a 64×64-element array) can be implemented using 7, 8, 9, 10 channels (i.e., coefficient channels)—the implementation being discussed further below—which is notably a substantial reduction to 4096 channels compared to a classical true-time delay and fully digital beamforming system. A 1024 M-element array (having a 32×32-element array) can be implemented using 5, 6, 7 channels in certain embodiments as compared to 1024 channels in a classical true-time delay and fully digital beamforming system. The hardware can be optimized to reduce the complexity and cost of the overall system by having complex mixed-signal circuits (e.g., DACs) correspond to the number of channels, e.g., k, and having moderate and simple circuitries (e.g., phase shifters, polarity inverters, and/or amplifiers) correspond to the number M of array modulation operators 124. The broadband transmitter array 106 and broadband receiver array 114 can be configured in any structured (e.g., an $M_x \times M_y$ array) or unstructured array patterned (e.g., arbitrarily placed on an object) in two or three dimensions.

In the example shown in FIG. 1, the receiver 104 (shown as 104*a*) is also configured with a demodulation unit 116 having k number of demodulation modules (stages or branches) 124 (shown as "Demodulation #1" 126*a*, "Demodulation #2" 126*b*, "Demodulation #3" 126*c*, and "Demodulation #k" 126*d*) that respectively connect to k number of ADC channels (shown as "ADC 1" 118*a*, "ADC 2" 118*b*, "ADC 3" 118*c*, and "ADC k" 118*d*), though as noted above, the number of demodulation modules (stages or channels) do not have to match that of the transmitter. Each demodulation module (stage or branch) (e.g., 126*a*, 126*b*, 126*c*, 126*d*) includes M number of array demodulation operators 128 (shown as 128*a*, 128*b*, 128*c*, 128*d*) (e.g., phase shifters, polarity inverters, and/or amplifiers) and connects at its inputs (shown having inputs "1 . . . M") to each of the elements of the array 114*a*, and connects at its outputs (shown having inputs "1 . . . M") to each of the ADC channels (e.g., 118*a*, 118*b*, 118*c*, 118*d*) through a combiner circuit 132 (e.g., comprising summation circuits). At the receiver, the hardware can be optimized to reduce the complexity and cost of the overall system by having complex mixed-signal circuits (e.g., ADCs) correspond to the number of channels, e.g., k, and having moderate and simple circuitries (e.g., phase shifters, polarity inverters, and/or amplifiers) correspond to the number of array modulation operators 128. In the example of the 4096-element array, the receiver 104*a* can be implemented with 7 channels having 7

ADC channels—again, a substantial reduction in ADC circuitry compared to a classical true-time delay and fully digital beamforming system.

In some embodiments, e.g., subarray processing operations may be employed in which the number of demodulation modules (stages or branches) does not have to match that of the transmitter element.

It should be appreciated that the number of channels k and number of array modulation and demodulation operator M can vary for a given application based on the system's available bandwidth, center frequencies, array aperture, among other factors. With appropriate available channel resources, the modulation unit and/or demodulation unit of the low dimensional encoding broadband beamformer system can be configured using a substantially lower number of channels to the number of array elements.

Model of Low Dimensional Encoding Broadband Beamformer System. Dimensionality reduction, or dimension reduction, is the transformation of data from a high-dimensional space into a low-dimensional space so that the low-dimensional representation retains some meaningful properties of the original data, ideally close to its intrinsic dimension. Working in high-dimensional spaces can be undesirable for many reasons—including the use of complex and expensive hardware architecture.

In the example of FIG. 1, the low-dimensional encoding broadband beamformer unit 108 (also referred to as modulation unit 108) and demodulation unit 116*a* includes a number of beamforming modules (122*a*-122*d* and 126*a*-126*d*) in which each module can be modeled as embedding a part of a vector matrix of a measurement matrix 1 into a source signal to embed the information in the source signal into a number of subspaces, e.g., Slepian subspaces, such as bandwidths, array apertures, and angles of arrival. The measurement matrix Φ, as further discussed herein, can be used to embed a basis vector, e.g., a Slepian basis vector, also referred to as prolate spheroidal wave functions, to which coefficients associated with the basis vector can be later retrieved. Notably, the coefficients can fully represent an underlying signal (e.g., having a number P), and the number of coefficients (e.g., k) are far fewer than the number of antenna elements (also having a number of P elements).

The configurations of the broadband beamformer unit 108*a* and demodulation unit 116*a* can be implemented, in some embodiments, as reversed implementations of each other and operate on the same general principles. In some embodiments, the broadband beamformer unit 108*a* and demodulation unit 116*a* can be implemented using phase-varying elements (as array modulation operators 124 and array demodulation operators 128) such as phase-shifters and gain controllers (see, e.g., FIG. 2)—two hardware component types found in a classical antenna array.

In the transmitter (e.g., 102, 102*a*), the phase varying elements (e.g., 124) in the modulation unit 108 can be modeled as applying a complex taper to a signal $s_k$, which can be modeled as equivalent to applying a basis vector across the array input. The complex taper can be represented as branching the DAC's output of a coefficient k (e.g., Slepian coefficient k) to M elements and applying a vector $a_k$ to the input signal $s_k$ to provide an output of each block as $a_k s_k$. The outputs of the demodulation unit 116 can then be summed, so the signal at the antenna can be represented as $$\sum\nolimits_{k=1}^{K} a_k s_k,$$

which is an approximation of a continuous signal $x_c$.

Similarly, in the receiver (e.g., 104, 104*a*), the phase varying elements (e.g., 128) in the demodulation unit 116 can receive an input signal from each antenna element and projects it onto a vector $s_k$, and sums the result into an ADC such that each ADC is sampling $a_k = s^*_k x_c$. The operation can be performed for each of the k basis vectors such that the total ADC output is $$a = [s^*_1 x_c, s^*_2 x_c, \ldots s^*_K x_c]^T.$$

Other hardware configurations may be used. The modulation unit 108 and demodulation unit 116 may be configured in parallel and/or series combinations. In a series configuration, the modulation unit 108 and demodulation unit 116 may be arranged in successive stages to employ operators from connected stages. Indeed, when the blocks are applied in series, the system must be designed to account for what the proceeding block applied to the signal.

Figure 2:
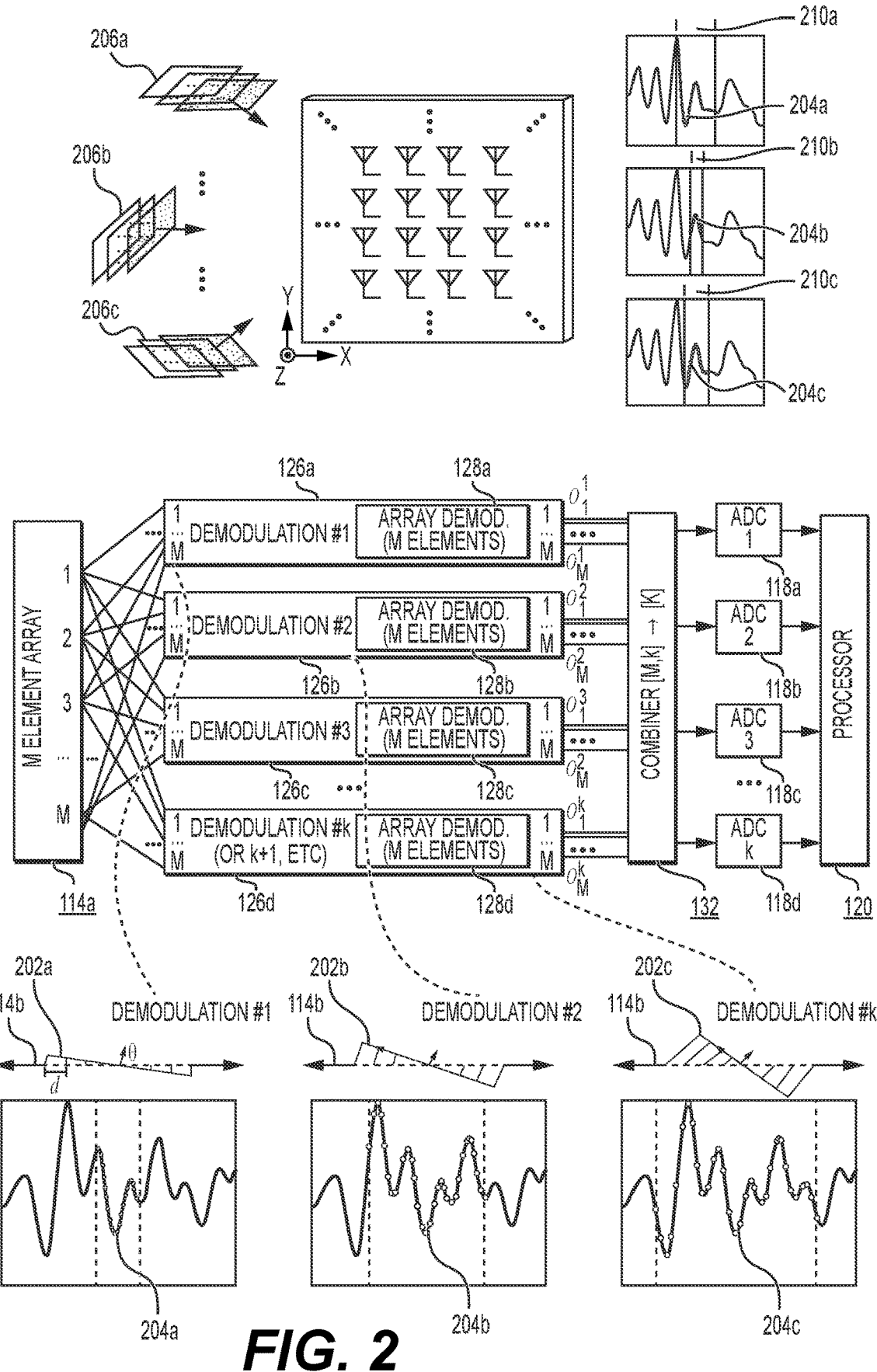
FIG. 2 shows an example measurement module (also referred to as a "demodulation module, branch, or stage) for an array receiver of a low dimensional encoding broadband beamforming system in accordance with an illustrative embodiment. The FIG. 3A shows an example implementation for the low dimensional encoding broadband beamformer system of FIG. 1 in accordance with an illustrative embodiment.

Example Slepian Subspace Model. FIG. 2 shows an example sampling operation of the signals of the array element according to a measurement basis, e.g., the prolate spheroidal wave functions, in a plane wave using a set of modulation modules (stages or branches) in which the signal information is embedded within the subspace of the plane wave, e.g., bandwidths, array apertures, and angles of arrival, that can be encoded and subsequently reconstructed by spatially sampling and measuring different incidents of the signals across the array.

In FIG. 2, an example uniform linear array 114 (shown as 114*b*) is shown to be evaluated by the measurement module (branch/stage) an incoming plane wave signal s(t) for three measurement scenarios (shown as 202*a*, 202*b*, 202*c*) in which each measurement scenarios has a different angle θ. The demodulation stage (e.g., 126*a*, 126*b*, 126*d*) are configured to apply complex weighting to evaluate for different measurement scenarios (shown as 204*a*, 204*b*, 204*c*) to a snapshot of a bandlimited signal y(t) as a set of M uniformly spaced samples (using M array elements) with the evaluation having a spacing τ=(d/c) cos θ. When the spacing of the sensor elements are tuned to the carrier frequency $f_c$, meaning that the sensors are a half-wavelength d=c/2$f_c$ apart, and $f_c$>>Ω, then the snapshot signal y(t) can correspond to a "burst" of M samples that are much more closely spaced than the Nyquist spacing of ½Ω.

In the example shown in FIG. 2, the graphs illustrate the temporal portion of the signal as would be observed through each of the three respective measurement module (e.g., branch/stage) when that branch applies a respective complex weight or demodulation to each of the M-sampled data that it receives. In other words, the three graphs are showing representations three different measurement scenarios (e.g., assuming different incident of arrival/angle) to which the sampled signal is evaluated. In the graph, the x-axis of the line in each of three graph represents a snapshot of a plane wave signal that would be evaluated by the application of a set of complex weighting at a measurement branch that is evaluating for a signal having some incidence. The data points of each of the graphs show the effective snapshot that M-sampled signal is being viewed due to different complex weighting that is being applied by the three different measurement module (branch/stage).

As shown in FIG. 2, for a uniform linear array, each snapshot of the array can produce a set of M uniformly spaced samples of the impinging signal in which each of the M data points represents a signal sampled by the M-element array. The change in spacing and amplitude, as shown in the graph, for each of the different measurement modules (branches/stages) for the same sampled signal shows the effect of the complex weighting of that measurement module (branch/stage) would have on the signal. The close spacing of the samples relative to the Nyquist rate means they are highly correlated, as is apparent from the relative smoothness between samples. The sampling interval and degree of correlation can be dependent on the angle of arrival with (a) signal 202*a* being near broadside (b) signal 202*b* at 45° and (c) signal 202*c* at near endfire. To this end, the measurement modules (e.g., 126*a*, 126*b*, 126*c*, 126*d*) allow for the measurement or evaluation of different prescribed angle of arrival (as an encoding subspace) to which the embedded coefficient of the plane wave are embedded in the encoding. In receiving a snapshot of the signal, each measurement module (branch/stage) (e.g., k measurement module) determine a single coefficient value for that snapshot (e.g., to provide k coefficients from M-samples/M-array elements).

To determine the value of a lower bound number of coefficient channels, it can be assumed that a transmitted signal impinging upon an array (e.g., 114) is 2Ω bandlimited around a center frequency $f_c$, and thus after demodulation, the array elements can observe time-shifted versions of the input signal s(t) per Equation 1.

$$S(f) = \int_{-\infty}^{\infty} s(t) e^{-j2\pi f t} dt = 0 \text{ for } |f| > \Omega \qquad \text{(Eq. 1)}$$

It can be further assumed for analysis purposes that the noise η in Equation 1 is zero such that y(t)={s(t−$\tau_m$)}$_m$ is exactly a collection of samples of s(t) at a different time or phase delays, e.g., associated with a different sampling projection.

Because the close spacing between the samples makes them heavily correlated, the number of effective degrees of freedom in the sampled signal y can be far below the number of elements M. The effective degrees of freedom in uniform samples of a bandlimited signal taken over a limited time interval is well-understood as reported in classical work by Landau, Pollack, and Slepian [23'], which gives a framework for describing these degrees of freedom using the eigenvalue decomposition of the M×M matrix per Equation 2.

$$B[m, n] = \begin{cases} 2W & \\ \dfrac{\sin(2\pi W(m-n))}{\pi(m-n)}, & m = n \\ & m \neq n \end{cases} \qquad \text{(Eq. 2)}$$

where W=τΩ (the sample spacing times the bandwidth), which in the example of the uniform linear array example means W=(Ω/2$f_c$) cos θ. If the source signal s(t) can be modeled as a Gaussian random process with a flat power spectrum on [−Ω, Ω], then the sampled signal y can be expressed as a Gaussian random vector with covariance B.

The matrix B is approximately, but not exactly, a projection onto a subspace of dimension 2WM. An example eigenvalue spectrum of covariance B for Ω=0.1 (e.g., $f_c$=120 GHz, Ω=24 GHz, and θ=π/6) and M=100 is about 18 eigenvalues of covariance B are ≈1 after which the spectrum decays at an extremely fast rate. According to [16'], the eigenvalue spectrum of the prolate matrix (i.e., Slepian matrix) demonstrates that the first 2WM eigenvalues cluster close to 1 while the eigenvalues exceed the 2WM point cluster close to 0. Eigenvalues that fall outside of these two clusters in the so-called "transition region" are provably few in number. To this end, an array snapshot y(t) of a "typical" bandlimited signal would have a vast majority of its energy focused in the subspace spanned by the eigenvectors corresponding to the 2WM coordinates. The eigenvector of covariance B corresponding to the $k^{th}$ largest eigenvalue can be referred to as the $k^{th}$ Slepian vector, in the example of Slepian measurement basis, and the span of the first K eigenvectors as the $K^{th}$ Slepian subspace.

Precise characterization of the spectrum of covariance B is provided in [14']. In [14'], it was shown that for L=[2WM], the $k^{th}$ largest eigenvalue $\lambda_k$ of B, with k≥L, satisfies Equation 3.

$$\lambda_k \le c_1 \exp\left(-\frac{k-L}{c_2}\right), k \ge L \qquad \text{(Eq. 3)}$$

where $c_1$ and $c_2$ are known (and reasonably small) constants that depend on log(L+1). That is, the size of the eigenvalues decays exponentially after hitting the edge of the plateau at k=L. This result leads to a quantitative bound on the amount of energy the snapshot y will have outside of the $K^{th}$ Slepian subspace. To this end, if snapshot y has covariance B, and $P_K$ denotes the projector onto the $K^{th}$ Slepian subspace, then $$E\left[\|y(t) - P_K y(t)\|_2^2\right] = \sum_{k=K-1}^{M} \lambda_k \le c_1 \exp\left(-\frac{k-L}{c_2}\right),$$

k≥L, where $c_3$ and $c_4$ are constants that depend only on log(L+1). Taking K just a little larger than L will ensure that the vast majority of the energy in y(t) is focused in the $K^{th}$ Slepian subspace. A reasonable heuristic, then, is that the snapshot y(t) across a uniform linear array of a bandlimited source arriving from an angle θ lies in a subspace of dimension approximately L:

$$y \in S_\theta, dim(S_\theta) \approx \max\left(\left\lceil \frac{\Omega}{f_c} M |\cos\theta| \right\rceil, 1\right).$$

The design criteria can extend readily to arbitrary array patterns and arrays arranged in two or three dimensions. A feature of the bounds above, and something that was only uncovered in the recent analyses [6', 7', 14'], is that they only depend on the product WM. This means that the results can be translated to the continuum (i.e., let the number of samples M grow as the space between them τ shrinks at the same rate, keeping WM constant). In the example of FIG. 1, consider M sensors $$\{z_m\}_{m=1}^M$$

placed in an arbitrary configuration with an impinging plane wave described by the normal vector u=[cos φ cos θ, sin φ cos θ, sin θ]$^T$. The effective aperture of the array can be seen as the width of the array as viewed from the angle of arrival and can be defined per Equation 4.

$$A_e = \left| \max_m \langle z_m, u \rangle - \min_m \langle z_m, u \rangle \right| \qquad \text{(Eq. 4)}$$

Given an effective aperture as would be evaluated by a given measurement module (branch/stage), the segment of signal that is impinging on the array at any moment of time has length T=$A_e$/c, the effective number of degrees of freedom is 2TΩ=2$A_c$Ω/c. This is a well-known rule-of-thumb based on classical asymptotic [22'] for which quantitative bound of the form (5),(6) have been recently put forth in [14']. This, in turn, acts as an upper bound on the degrees of freedom for the array: no matter how many elements the system has and how they are spaced, a snapshot in time will lie very close to a fixed subspace of dimension 2$A_e$Ω/c.

In FIG. 2, an $M_x$×$M_y$ array (e.g., 32×32 uniform planar array (UPA) array where the impinging signal has a bandwidth of 5.5 GHz and resides at a center frequency of 28 GHz) can operate with the demodulation unit (e.g., 116) to evaluate snapshots of the array in which each snapshot is a set of samples from s(t) evaluated for an observed temporal window with a width determined by the effective aperture defined by the measurement stage. Different evaluated angles of arrival (shown as 206a, 206b, 206c) provides a different temporal windows (shown as 210a, 210b, 210c) with varying sampling patterns within (shown as 204a, 204b, 204c).

It can be observed that each evaluated snapshot (e.g., 204a, 204b, 204c) of the array sampled data provides a sampling of the array over a temporal window determined by the effective aperture defined by the measurement module (branch/stage). In turn the window's width can vary depending on the angle of incidence that a given measurement module (stage/branch) is measuring or evaluating the received signal. Furthermore, the measurement module can evaluate for a sampling pattern within this temporal window that can also be dependent on the angle at which the signal arrives. For the general case of an $M_x$×$M_y$ array, it can be assumed that the angle of arrival is only limited in azimuth (as is generally the case in array design), and thus the effective aperture given by Equation 4 can be reduced to $$A_e = \frac{\lambda}{2} \sqrt{M_x^2 + M_y^2} |\cos\theta|.$$

Therefore, any snapshot of the array y approximately that lies in a subspace $$S_\theta^{UPA}$$

can have a dimension $$dim\left(S_\theta^{UPA}\right)$$

per Equation 5 in which the dimension corresponds to the number of modulation and/or demodulation units (e.g., 122, 126).

$$dim\left(S_\theta^{UPA}\right) \approx \max\left(\left\lceil \frac{\Omega}{f_c} \sqrt{M_x^2 + M_y^2} |\cos\theta| \right\rceil, 1\right) \qquad \text{(Eq. 5)}$$

Indeed, the degrees of freedom grows proportionally at a modest rate of $\sqrt{M_x^2+M_y^2}$ and not with the number of elements in the array, as classical thinking may dictate. For exceedingly large arrays, the underlying subspace dimension can be drastically smaller than the number of elements in the array.

Consider an example for a 64×64 uniform planar array operating at 70 GHz and a bandwidth of 7 GHz (which is contemplated for a standard automotive radar scheme), if the system is configured to observe at a 45-degree viewing angle, then the dimension corresponding to the number of modulation and demodulation units (e.g., 122, 126) can be determined per Equation 5 to be "7" (i.e., 7 stages) in which $$\max\left(\left\lceil \frac{\Omega}{f_c}\sqrt{M_x^2 + M_y^2}\,|\cos\theta|\right\rceil, 1\right) = 7.$$

While a true time-delay implementation for a 4096 element array may be infeasible for this frequency range and digital beamforming as it would require 4096 ADCs/RF-chains, the exemplary system can be implemented with slightly more than 7 ADCs/RF-chains corresponding to a same number of coefficient channels—a substantial 99.8% reduction in hardware complexity. The exemplary system can leverage shifts of a bandlimited signal over a limited interval to embed signal information in a known low dimensional linear subspace. When the signal has significant bandwidth, the dimension of the subspace can grow but only by a modest amount. Put another way, a simple vector-matrix multiply, tuned to the direction(s) the signal(s) is (are) coming from, can be performed to collapse the size of samples from the number of array elements into a much smaller output vector without sacrificing the array gain to provide significant savings (fewer ADCs/RF-chains) in digitizing the signals. For a uniform planar array, the reduction can be expressed by a factor per Equation 6.

$$\rho = \frac{f_c}{\Omega}\frac{M_x M_y}{\sqrt{M_x^2 + M_y^2}\,|\cos(\theta)|}\qquad\text{(Eq. 6)}$$

While FIG. 2 shows the projection of the plane wave on a UPA array in one angle of arrival θ in the x-axis and y-axis of the array, in other embodiments, the system can be configured to treat the signals received along the x-axis and y-axis independently in which each respective signal lies in its own low dimensional subspace with its own effective aperture. While the dimensionality of this measurement scheme would grow with the number of elements in the array, the configuration may be preferred in certain implementations due to its relative simplicity. The dimensionality of subspaces for the independent x-axis and y-axis projections can be expressed per Equation 7.

$$dim\left(S_{\theta,\phi}^x\right) \approx \max\left(\left\lceil N\frac{\Omega}{f_c}|\cos\phi\ \cos\theta|\right\rceil, 1\right),\qquad\text{(Eq. 7)}$$

$$dim\left(S_{\theta,\phi}^y\right) \approx \max\left(\left\lceil M\frac{\Omega}{f_c}|\cos\phi\ \sin\theta|\right\rceil, 1\right)$$

The total dimension of the tensor space can be expressed as $$dim\left(S_{\theta,\phi}^{xy}\right) = dim\left(S_{\theta,\phi}^x\right)\cdot dim\left(S_{\theta,\phi}^y\right).$$

From an analysis perspective, the spacing of samples from s(t) taken along the x and y axis is uniform which in turn allows for tighter bounds on the eigenvalue behavior to be obtained with ease [6', 7', 14', 16'].

Example Modulation and Demodulation Units

Figure 3A:
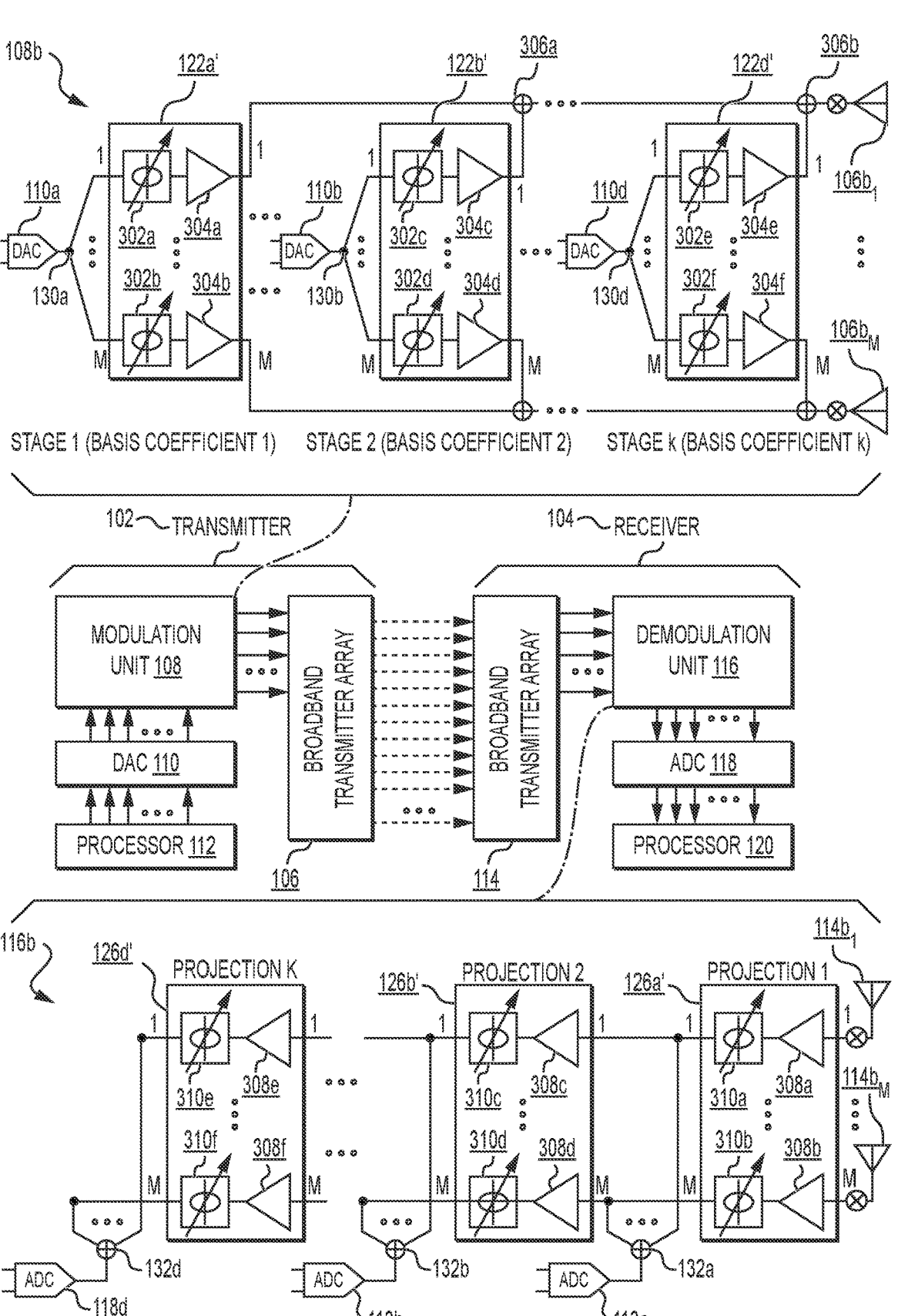
FIGS. 3B and 3C show other example implementations for the low dimensional encoding broadband beamformer system of FIG. 1 in accordance with an illustrative embodiment.
FIG. 3D shows examples of array measurement elements (also referred to herein as array demodulation elements) of the measurement modules of FIGS. 1, 2, 3A, 3B, and 3C in accordance with an illustrative embodiment.
Figure 3B:
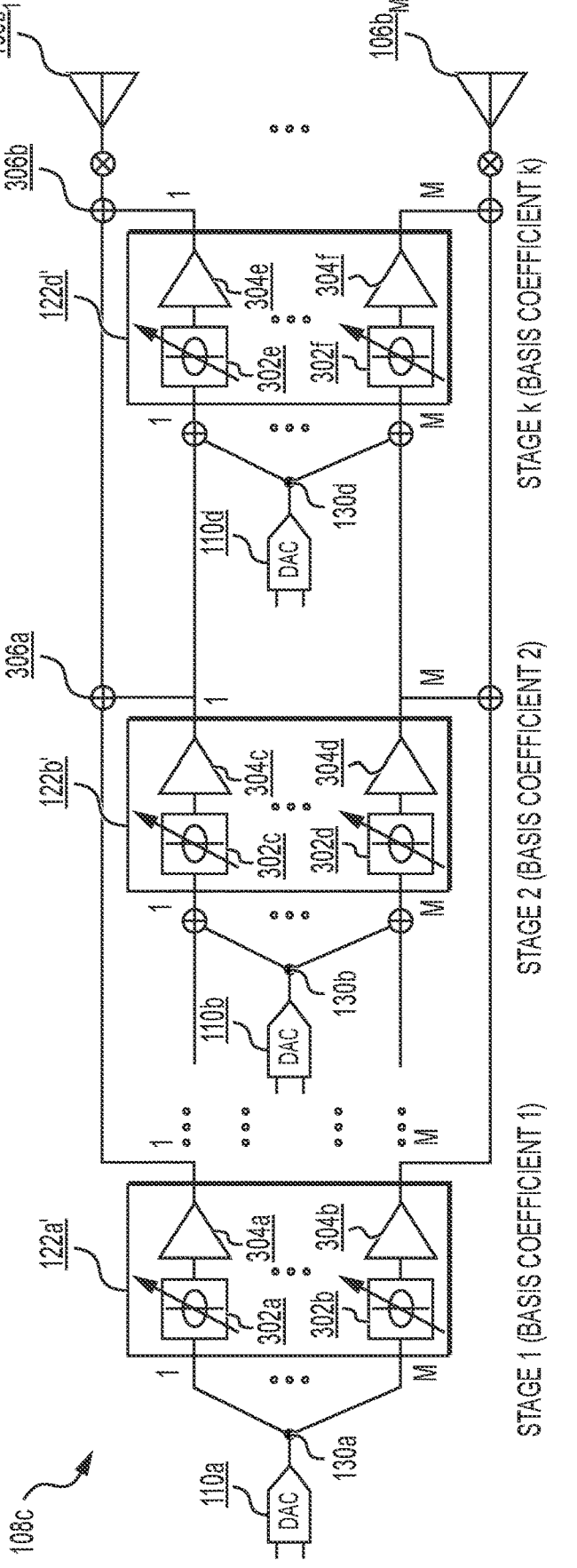
Figure 3C:
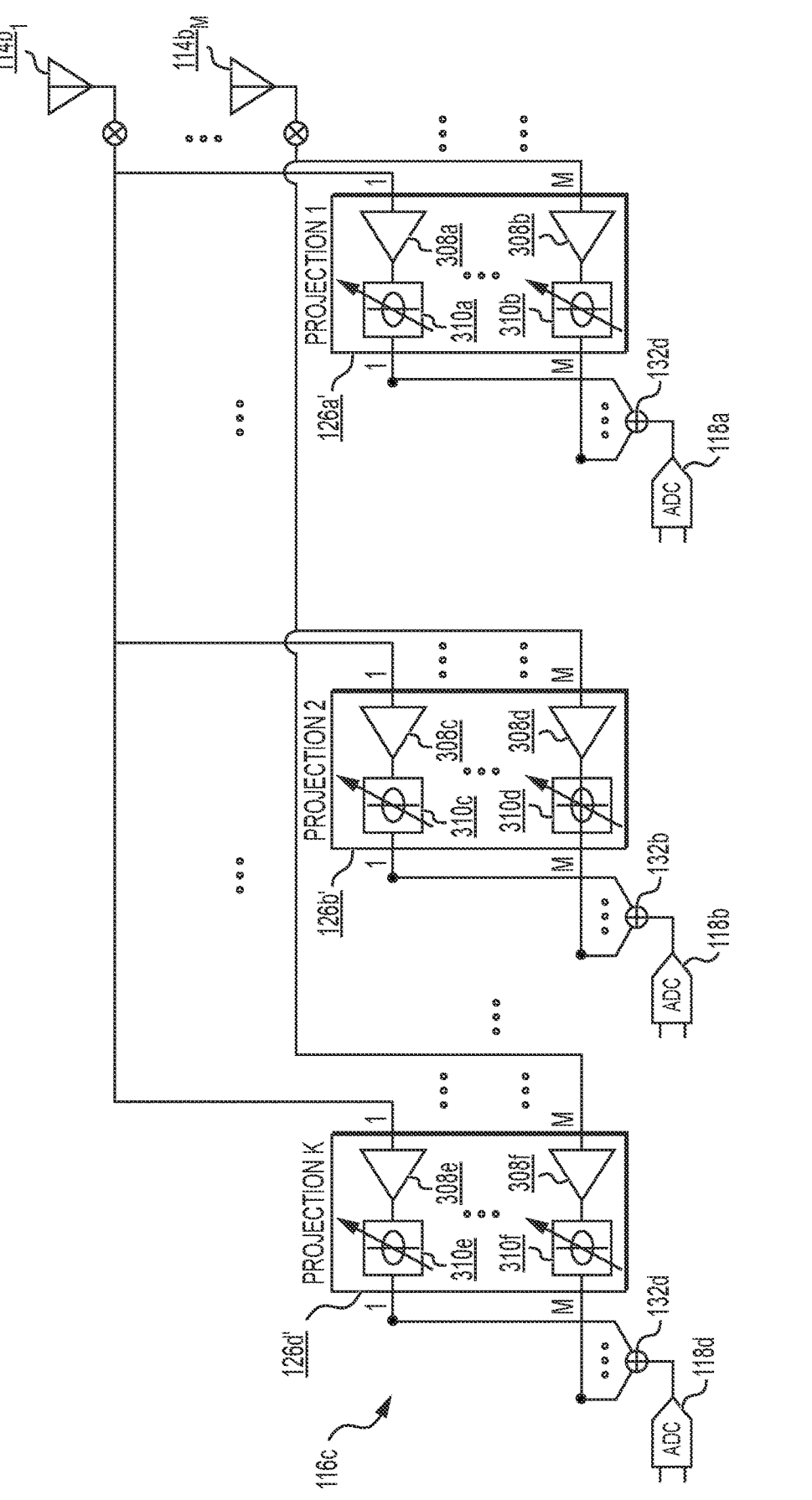

FIGS. 3A and 3B each shows an example configuration for the modulation unit 108 (shown as 108b and 108c respectively) and demodulation unit 116 (shown as 116b and 116c, respectively).

In the example of FIGS. 3A and 3B, three modulation units 122 (shown as 122a', 122b' and 122d') are shown as modulation stage "1" 122a' to modulation stage "k" 122d' in parallel or series configuration that can each respectively generate basis coefficients 1 to k.

In FIGS. 3A and 3B, each modulation stage (e.g., 122a', 122b', 122d') of the transmitter (108b and 108c) includes M number of array modulation elements 124 each comprising a phase shifter 302 (shown as 302a, 302b for stage "1" 122a'; 302c, 302d for stage "2" 122b'; 302e, 302f for stage "k" 122d') that connects to a gain amplifier 304 (shown as 304a, 304b for stage "1" 122a'; 304c, 304d for stage "2" 122b'; 304e, 304f for stage "k" 122d'). The M number of array modulation elements 324 are connected to a respective M input from a DAC (shown as 110a, 110b, 110d) through a passive splitter 130 (shown as 130a, 130b, 130d). Other splitter circuits may be employed (e.g., active circuits). The outputs of the gain amplifiers (304a, 304c, 304e; 304b, 304d, 3040 for each modulation stage are combined, e.g., via a summation circuit (shown as 306a, 306b), at the antenna element (shown as 106b1 for antenna element "1" and 106b_M for antenna element "M"). In FIG. 3A, the array modulation elements 124 of each modulation stage 122 of the transmitter (108b) are not connected in successive stages as a parallel configuration, and in FIG. 3B, the array modulation elements 124 of each modulation stage 122 of the transmitter (108c) are connected in successive stages as series configuration.

Also, three demodulation units 128 (shown as 126a', 126b' and 126d') are shown as demodulation stage "1" 126a' to demodulation stage "k" 126d' to respectively measure projection 1 to k. Each demodulation stage (e.g., 126a', 126b', 126d') includes M number of array demodulation elements 128 each comprising a gain amplifier 308 (shown as 308a, 308b for stage "1" 126a'; 308c, 308d for stage "2" 126b'; 308e, 308f for stage "k" 126d') that connects to phase shifter 310 (shown as 310a, 310b for stage "1" 126a'; 310c, 310d for stage "2" 126b'; 310e, 310f for stage "k" 126d'). The M number of array demodulation elements 128 are connected to a respective M input from the antenna array element 114 (shown as 114b_1 114b_M). The outputs of the phase shifters (310a, 310c, 310e; 310b, 310d, 310f) connects to a successive demodulation stage. The outputs of the phase shifters (310a, 310c, 310e; 310b, 310d, 310f) for each demodulation stage 126 are coupled to a respective combiner circuit 132 (shown as a summation circuit 132a, 132b, 132d). In FIG. 3A, the array demodulation elements 128 of each demodulation stage 126 of the receiver (116b) are connected in successive stages as a series configuration, and in FIG. 3B, the array demodulation elements 128 of each demodulation stage 126 of the receiver (116c) are connected in successive stages as parallel configuration.

Figure 3D:
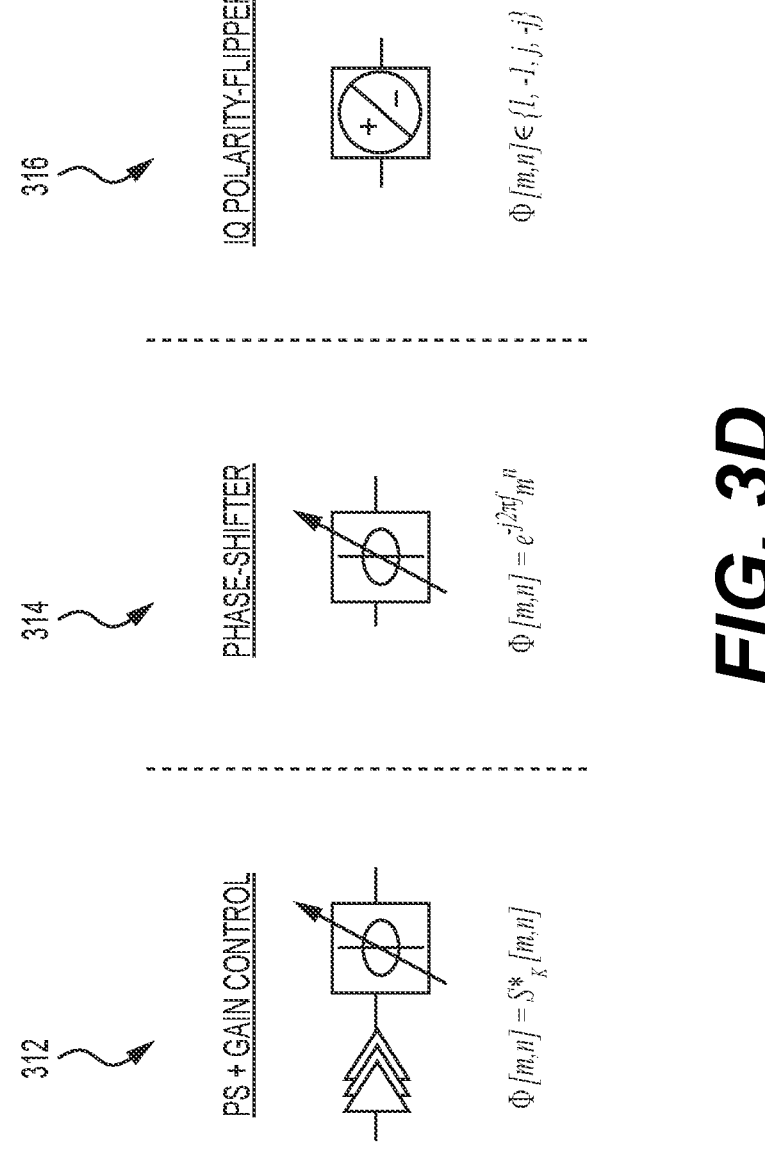

FIG. 3D shows examples of array modulation elements 124 and array demodulation elements 128 as any one of a phase shifter and gain combination 312, a phase shifter circuit 314, and a polarity inverter 316 (shown as IQ Polarity-Flipper).

Example Post-Processing

Figure 4A:
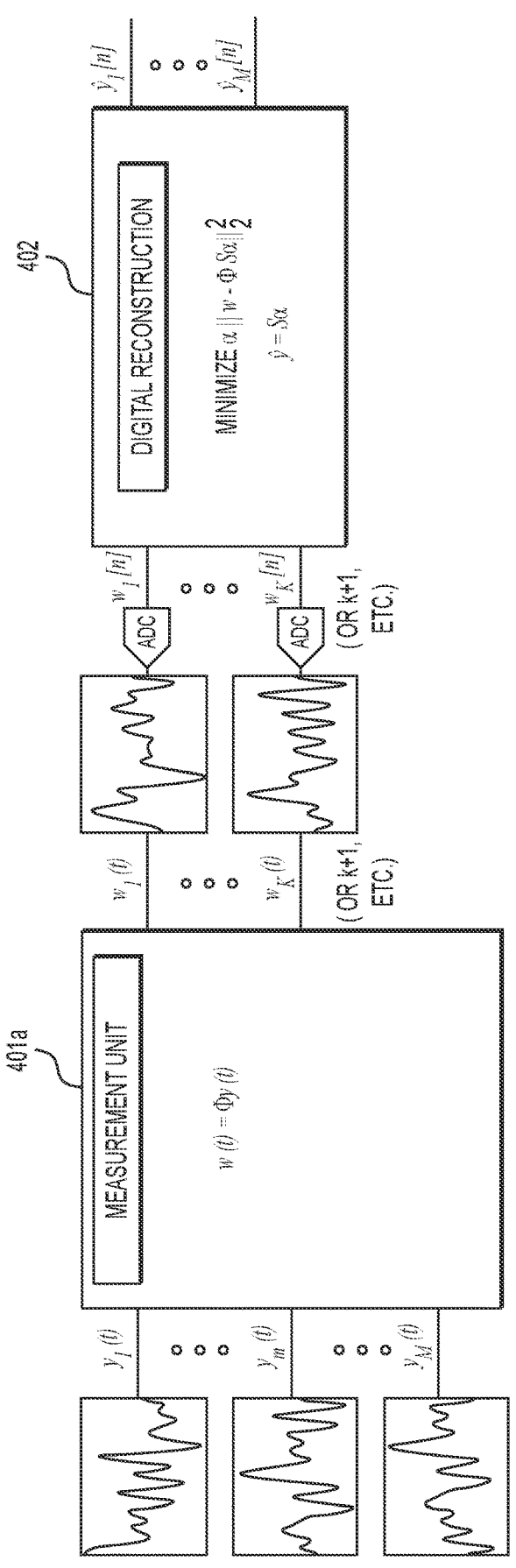
FIGS. 4A, 4B, 4C, and 4D each show a diagram of a measurement unit for a low dimensional encoding broadband beamformer system used with a signal reconstruction module, a source localization module, a signal classification module, and a communication decoder module, respectively, in accordance with an illustrative embodiment.
Figure 4B:
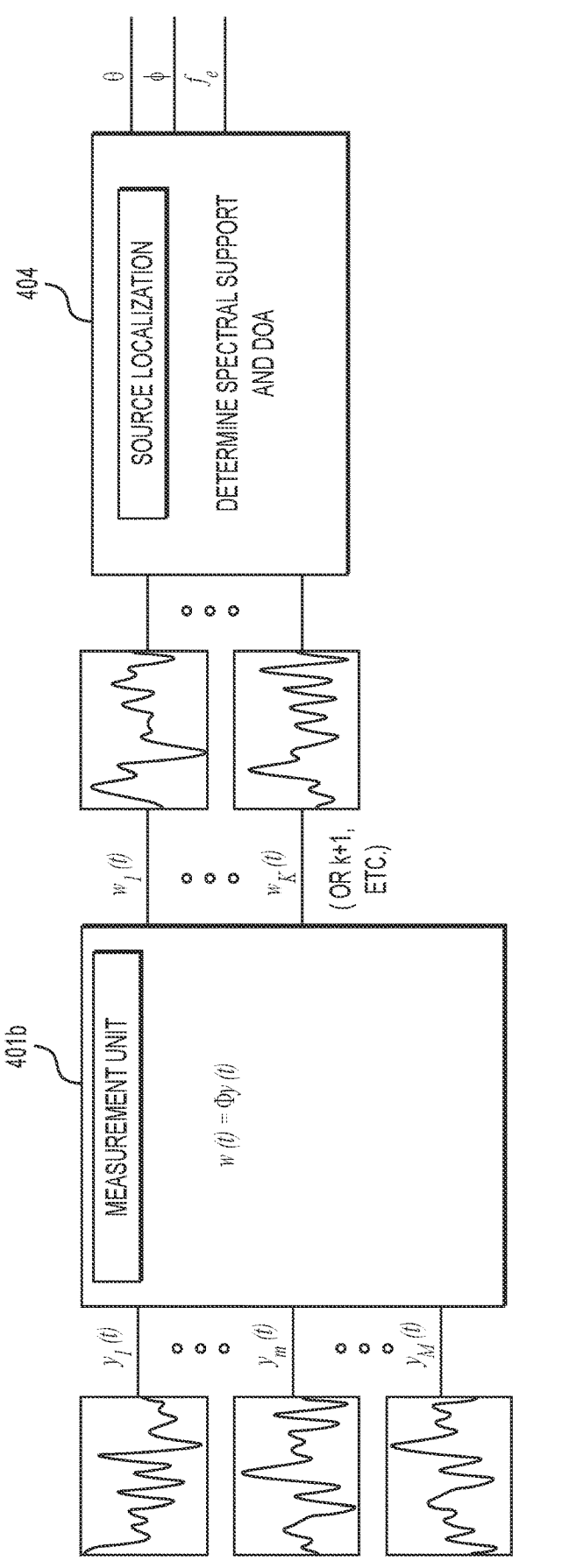
Figure 4C:
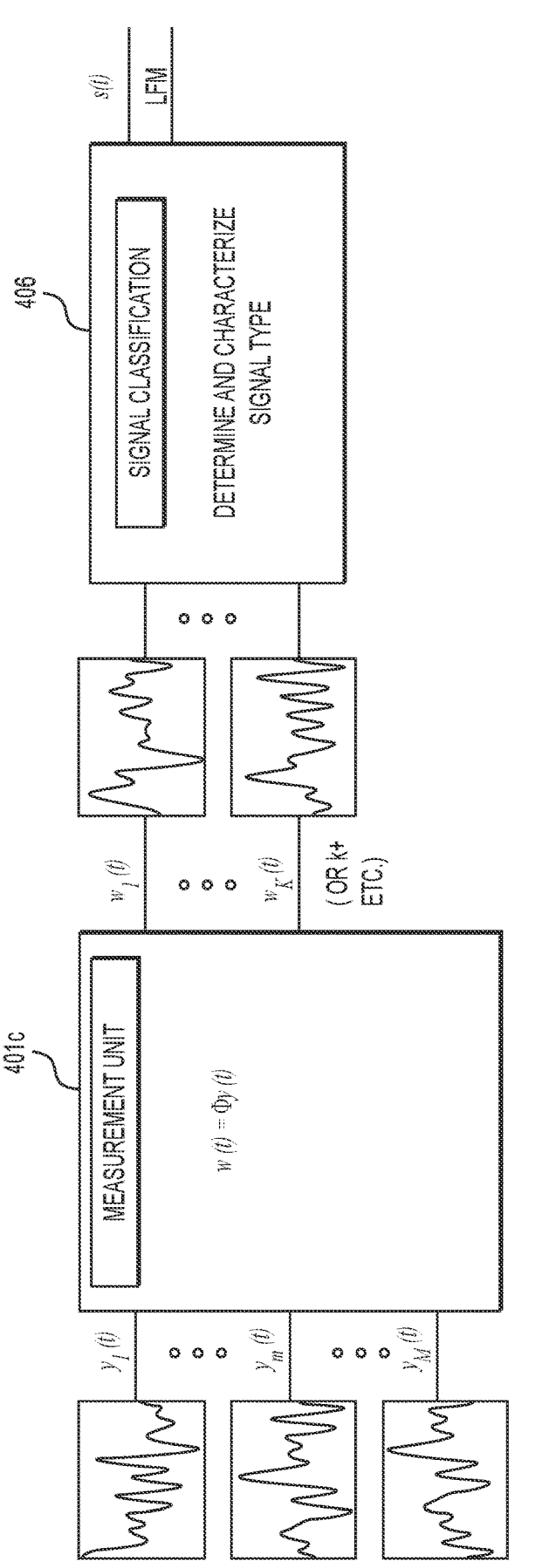
Figure 4D:
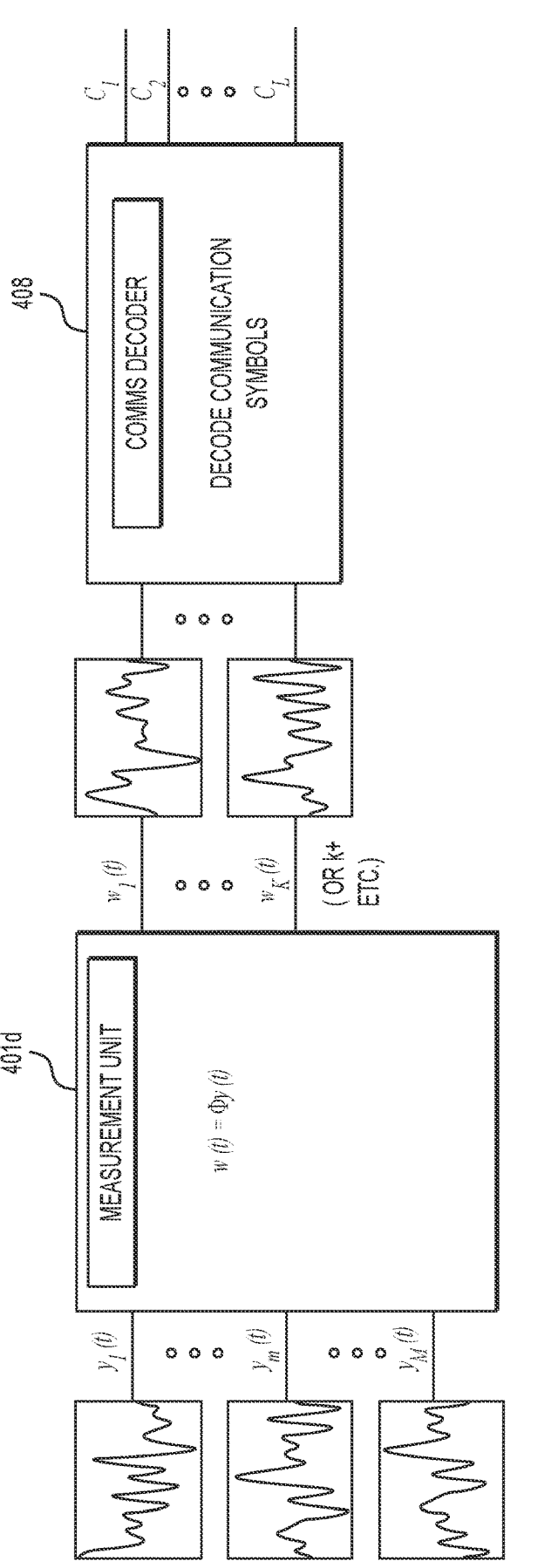

The receiver 104 can be configured for use in a MIMO communication network, a RADAR system, a SONAR system, or any other number of receivers described herein. FIG. 4A shows a mixed-signal encoder 401 (shown as 401a), e.g., comprising the demodulation units 116 and ADCs 118 to provide digitally sampled coefficient outputs $y_1[n]$ to $y_k[n]$ to a digital reconstruction module 402 that can reconstruct an approximation of fully digital acquisition. FIG. 4B shows the mixed-signal encoder 401 (shown as 401b) being configured to provide the digitally sampled coefficient outputs to a source localization module 404 that can provide signals spectral support and output the direction of arrival (DOA) of the plane wave. FIG. 4C shows the mixed-signal encoder 401 (shown as 401c) being configured to provide the digitally sampled coefficient outputs to a signal classification module 406 that can determine underlying signal and classify its type, e.g., LFM, comms signal, etc. FIG. 4D shows the mixed-signal encoder 401 (shown as 401d) being configured to provide the digitally sampled coefficient outputs to a communication decoder module 408 to decode communication symbols that are encoded in the reduced readout coefficients.

In FIGS. 4A-4D, the mixed-signal encoder 401 is configured to receive M linear combinations of analog inputs (e.g., M analog inputs, $x_1(t)$ to $x_M(t)$ as shown in this example), e.g., from each of the antenna array elements, or subarray portion of the analog inputs as described herein. The demodulation units 116d-116g (e.g., having K demodulation channels, or some the K as described herein, e.g., K+1, K+2, etc.) then each applies a measurement basis function $\Phi$ to the number of K, K+1, K+2 coefficient channels to provide the digitally sampled coefficient outputs $y_1[n]$ to $y_k[n]$ for a given application. In FIG. 4A, the digital reconstruction module 402 is shown to reconstruct an approximation of a fully digital acquisition to provide the source signal $\hat{x}_1[n]$ to $\hat{x}_M[n]$, e.g., as provided in the example below. It is noted that each time series plot in FIG. 4A shows the time varying signal received at each individual M-element of the array. In contrast, FIG. 2 show the graphs with a snapshot of the signal at a single instance in time as received by all M-elements of the array.

In FIG. 4B, the source localization module 404 is shown to provide signals spectral support and output, e.g., the direction of arrival (DOA) $\theta$ and/or $\phi$ or other properties of the plane wave, e.g., center frequency $f_c$.

In FIG. 4C, the signal classification module 406 is shown to provide classification outputs s(t) or some indication of the signal, e.g., that the signal is LFM.

In FIG. 4D, the communication decoder module 408 is shown to provide communication symbols $c_1$ to $c_L$.

Example #1—Example Operation for Measurement and Signal Reconstruction

Referring to 4A, an example method is shown to measure and reconstruct a signal from an array having low dimensional linear subspace. The reconstruction can be modeled or considered mathematically with an underlying subspace of K to provide a signal having the form $$s(\tau) = \sum_{k=1}^{K} \alpha_k \psi_k(\tau) \text{ where } \{\psi_k(\tau)\}_{k=1}^{K}$$

is a measurement basis such as the prolate spheroidal wave functions ("Slepian basis"), DFT basis, Binary basis, random ("Gaussian") basis, among others. In this abstraction, for a single snapshot of an M-element array, the receiver (e.g., 104) can observe or measure samples of s(t) at lags $\tau_m$ per Equation 8.

$$\begin{bmatrix} s(\hat{t} - \tau_1) \\ s(\hat{t} - \tau_2) \\ \vdots \\ s(\hat{t} - \tau_M) \end{bmatrix} = \begin{bmatrix} \psi_1(\tau_2) & \psi_2(\tau_1) & \dots & \psi_K(\tau_1) \\ \psi_1(\tau_2) & \psi_2(\tau_2) & \dots & \psi_K(\tau_2) \\ \vdots & \vdots & \ddots & \vdots \\ \psi_1(\tau_M) & \psi_2(\tau_M) & \dots & \psi_K(\tau_M) \end{bmatrix} \begin{bmatrix} \alpha_1 \\ \alpha_2 \\ \vdots \\ \alpha_K \end{bmatrix} \quad \text{(Eq. 8)}$$

where K<<N. Equation 8 can be written compactly as $y(\hat{t})=S\alpha$ where the sampled prolate spheroidal wave functions contained in the columns of S are Slepian basis vectors. This is effectively the synthesis equation for the set of noiseless samples of s(t). Based on the properties of the basis functions, S has full column rank, and the receiver (e.g., 104) can recover the coefficients as $\alpha=(S^H S)^{-1}S^H y(\hat{t})$. A key observation is that the coefficients are all the receiver (e.g., 104) required to fully represent the underlying signal s(t), and the number of coefficients is far fewer than the number of antenna elements. Thus, the receiver (e.g., 104) can measure the array output for the signal of interest by taking linear combinations of the samples to produce a limited array readout in the form of $\alpha$. This does not require the narrowband assumption nor the use of true-time delays or a fully digital acquisition of the signal.

An exemplary low dimensional encoding beamforming operation can employ this subspace model and array operations by sampling the coefficients, as noted above, instead of the signal itself. Each coefficient can take the form of a linear measurement, which as shown in FIGS. 3A-3D can be implemented as an RF chain that performs a weighted sum of the array output prior to sampling. In comparison to true-time delay and fully digital beamforming, the number of RF chains required to beamform using the exemplary method and can employ relatively straightforward and inexpensive hardware circuitries.

As an example, a 32×32 element array that approximately lies in a subspace dimension of 5 with a sufficient aperture and bandwidth can be beamformed using 6 Slepian measurements. The signal is nearly identical to the output from a true time delay or fully digital system but with a substantial 99.4% decrease in the number of RF chains generally required for such performance (from 1024 to 6).

As noted above, the beamforming process is not limited only to measurements using the Slepian basis vectors S. Rather the system can be configured to recover a signal to high accuracy using a more general measurement operator, which can be denoted by the matrix $\Phi$. For each temporal snapshot, it observes $\omega=\Phi y_0+\eta$, and recover the signal amounts to solve the optimization program per Equation 9.

$$\text{minimize}_\alpha \|\omega - \Phi S\alpha\|_2^2 \quad \text{(Eq. 9)}$$

Equation 9 has a closed-form solution given by $\tilde{\alpha}=(\Phi S)^{\dagger}\omega$, where the dagger † indicates the standard pseudo-inverse operator, to provide $\hat{y}=S\hat{\alpha}$. The output can have two sources of error: the part of $y_0$ that is not in the Slepian subspace (the modeling error), and the error $S(\Phi S)^{+}\eta$ due to the perturbation. The modeling error is expected to be small in general and can be bounded precisely when the signals s(t) are modeled as a random process. The perturbation error depends on $\eta$ and on how $\Phi$ aligns with S. The unperturbed samples of s(t) can be written as $y_0=S_{\alpha_0}+S_{\perp}B_0$ where $S_{\perp}$ is the orthogonal compliment of S. The reconstructed samples $\hat{y}$ can be determined per Equation 10, which then provides Equation 11.

$$\hat{y} = S(\Phi S)^{\dagger}w = S\alpha_0 + S(\Phi S)^{\dagger}S\Phi S_{\perp}\beta_0 + S(\Phi S)^{\dagger}\eta \qquad \text{(Eq. 10)}$$

$$\|y_0 - \hat{y}\|_2^2 = \|S_{\perp}\beta_0 - S(\Phi S)^{\dagger}(\Phi S_{\perp}\beta_0 + \eta)\|_2^2 \qquad \text{(Eq. 11)}$$

$$= \|\beta_0\|_2^2 + \|(\Phi S)^{\dagger}(\Phi S_{\perp}\beta_0 + \eta)\|_2^2$$

For the second term in Equation 11, an arbitrary vector e would yield $$\|(\Phi S)^{\dagger}e\|_2^2 \le \|(\Phi S)^{\dagger}\|_2^2\|e\|_2^2 = \frac{1}{\sigma_M^2}\|e\|_2^2$$

where $\sigma_M$ is the smallest singular value of $\Phi S$, and for a random vector e, $$\left[E\|(\Phi S)^{\dagger}e\|_2^2\right] = \left(\frac{1}{M}\sum_{m=1}^{M}\frac{1}{\sigma_m^2}\right)\left[E\|e\|_2^2\right].$$

The conditioning of $\Phi S$ is of paramount importance when designing the measurement matrix $\Phi$. Additionally, the error term $S(\Phi S)^{+}\Phi S_{\perp}B_0$ can be limited by designing $\Phi$ to be as spectrally concentrated as possible.

There are a variety of reasons why other types of $\Phi$ may want to be employed, e.g., to reduce hardware complexity. The system may be heavily constrained in terms of power or resolution such that simplified architectures are more practical. One such simplification would be to require the components of the measurement matrix to be unimodular such that $\Phi[m, n]=e^{-j2\pi f_m^n}$. In turn, this removes the need for tapering and maps to a more traditional hardware framework. A further simplification would be to reduce the resolution of the phase-shifters to 2-bits such that $\Phi[m, n]\in\{1, -1; j, -j\}$. The elements needed to employ this type of measurement can be extremely simple and low-loss, making them of particular interest for 5G/6G systems. The choice in measurements $\Phi$ constrained to the condition that $\Phi S$ is relatively preserved. To this end, the elements of $\Phi$ can be chosen to be drawn from an i.i.d. complex Gaussian distribution and still achieve decent recovery.

Signal Isolation, Interferer Rejection, Signal-to-Noise Ratio, and other Characterization. The exemplary method and system can be readily configured accordingly for any number of applications. A common method of quantifying a beamformer's performance is examining its ability to spatially isolate signals. Often termed "sidelobe" behavior, the analysis quantifies the ability of the system to block out signals that are coming from directions outside the region of interest, whether it be noise or an interferer. It can be assumed that each snapshot of the array is a collection of samples from a stationary, ergodic, mean-zero, Gaussian-stochastic process x(t) with power spectral density per Equation 12:

$$S(f) = \begin{cases} \gamma^2 & f\in|f_c - \Omega, f_c + \Omega| \\ 0 & \text{else} \end{cases} \qquad \text{(Eq. 12)}$$

where $f_c$ and $\Omega$ are the center frequency and bandwidth, respectively. For a uniform linear array where the temporal samples are taken uniformly with period $T=\cos\theta/(2f_c)$, for a set of N samples from the process $x[n]=x(nT)$ for $n=0, 1, \ldots, N-1$, the covariance matrix can be expressed as Equation 13:

$$R_\theta = \int_{f_\theta-W_\theta}^{f_\theta+W_\theta} e_f e_f^* df = E_{f_\theta}B_\theta E_{f_\theta}^* \qquad \text{(Eq. 13)}$$

where $f_\theta=\cos\theta/2$ and $W_\theta=\Omega/2f_c\cos\theta$ are spatial bandwidth and center frequency respectively. Furthermore $E_{f_\theta}[n, n]=$and $B_\theta$ is the prolate matrix associated with $W_\theta$.

Signal to noise ratio (SNR) can be calculated per Equation 14:

$$SNR = \frac{\gamma^2\sum_{k=1}^{K}\lambda_k}{\sigma^2 K} \qquad \text{(Eq. 14)}$$

Because $$\sum_{k=1}^{K}\lambda_k = 2NW$$

and the eigenvalues exponentially decrease after $k\ge2NW$, a properly chosen K the ratio $$\frac{\sum_{k=1}^{K}\lambda_k}{K}$$

can thus remain close to 1, indicating a modest loss in SNR. During the reconstruction operation, the signal the expected error can be expressed as Equation 15:

$$E\|x - \Phi^*y\|_2^2 = E\|(I - \Phi^*\Phi)x\|_2^2 + E\|\Phi^*\Phi_n\|_2^2 \qquad \text{(Eq. 15)}$$

$$= \underbrace{\gamma^2\sum_{k=K+1}^{N}\gamma_k}_{\text{(bias)}} + \underbrace{\frac{\sigma^2 k}{\text{(variance)}}}$$

The bias term on the left is the approximation error due to the model mismatch. Due to the eigenvalues exponential decrease after the threshold of [2NW], the bias term decreases drastically as well in this regime. The noise error term on the right ("variance") can grow linearly with the number of measurements K. Hence there is a design tradeoff based on the number of measurements. More measurements equate to a drastically reduced bias but will amplify the noise.

The expected energy of the beamformer can be expressed as Equation 16:

$$E\{\|\Phi x\|_2^2\} \le \sum_{k=1}^{K}(1-\lambda_k^*) \quad \text{(Eq. 16)}$$

where $$\lambda_k^*$$

is the $k^{th}$ dominant eigenvalue of the prolate matrix associated with $W_\theta^*$.

Equation 16 indicates that the expected energy is a function of the spectral concentration of the Slepian basis (or other basis) vectors. Because the concentration of the eigenvalues, this term can be made exceptionally small by choosing $k \le \lfloor 2NW \rfloor$.

Example #2—Reduced Complexity Measurement

As noted above, the measurement matrix $\Phi$ does not need to comprise transposed Slepian basis vectors. Indeed, a drastically simplified architecture can be implemented where $\Phi[m, n] \in \{1, -1, j, -j\}$. Though these binary IQ systems are extremely convenient for systems operating in restrictive environmental regimes, the design of such a matrix can be implemented, e.g., by building on the work of Duarte et al. on spectrally shaped binary sequences, a principled design method can be devised [19'], which is incorporated by reference herein.

The design problem, in a simple represented form, can amount to designing the $\tilde{K}$ rows of $\Phi$ such that they preserve the conditioning of the Grammian associated with $\Phi E_j S$. One method of doing this is to insure $$|S_K^* E_F^* \phi_k, S_K^* E_F^* \phi_{k'}|^2$$

is small for $k \ne k'$. An optimal choice may result in an orthogonal set of sequences, but looser constraints may be applied, e.g., by preserving the conditioning of the Grammian, which can represent only one of the desired properties of the measurements vectors. To produce highly directive beams, it may be desired for each $\phi_k$ to be as spectrally concentrated as possible in the band of interest by minimizing 12 norm $$\|S_\perp^* E_F^* \phi_k\|_2^2.$$

A basis vector that can express such desired behaviors can be determined by iteratively solving the optimization program per Equation 17 for a full set of $\tilde{K}$ vectors:

$$\text{minimize}_{\phi_k \in \mathbb{C}^M} \|S_\perp^* E_F^* \phi_k\|_2^2 \quad \text{s.t.} \quad \begin{array}{l} |\langle S_K^* E_F^* \phi_k, S_K^* E_F^* \phi_{k'}'\rangle|^2 \le \\ \alpha \text{ for } k' \ne k \\ \phi_k[m] \in \{1, -1, j, -j\} \text{ for } m = 1, \dots, M \end{array} \quad \text{(Eq. 17)}$$

The optimization program can be expressed as a semi-definite program can be solved efficiently using interior-point methods per Equation 18:

$$\text{minimize}_{T \in \mathbb{S}_+^{2M}} \text{trace}(D_\perp^* D_\perp T) \quad \text{s.t.} \quad \begin{array}{l} \text{trace}(D^* D z_{k'} z_{k'}^*, D^* DT) \le \\ \alpha \text{ for } k' \ne k, \\ T[m, m] = 1 \text{ for } m = 1, \dots, M \end{array} \quad \text{(Eq. 18)}$$

Projecting this approximate solution into the feasible region can be accomplished through a randomized search, e.g., by drawing $v \sim \mathcal{N}(0, T)$ and generating a candidate solution vector $\hat{s}_k = \text{sign}(v)$. This can be repeated for a fixed number of iterations and whichever candidate solution satisfies the constraints and objective to the fullest extent is chosen as the approximate solution.

Example #3—Fast Slepian Computation

The exemplary broadband beamforming system can be configured in a two-step process. In a one-step process, the array snapshots are first embedded to produce a limited array read-out from which the original snapshot of the array can then be received. Following this operation, standard digital coherent array processing or similar operations can be performed.

However, when temporal decimation is performed, the exemplary broadband beamforming system can be configured with a second step to recover the uniformly-spaced samples. Fast Slepian computational methods can be employed for either step to be performed with high efficiency. Karnik et al. [16'] devised fast Slepian embeddings and reconstructions as a projection onto the range of the Slepian basis vectors being well approximated by a DFT operation and a low-rank correction. In particular, for a uniform set of samples, it was shown that $$S_{N,W} S_{N,W}^* = \underbrace{F_{N,W} F_{N,W}^*}_{(DFT\ vectors)} + \underbrace{L_1 L_2^*}_{(Low\ rank)} + E$$

where E is an error term that satisfies $\|E\| \le \epsilon$. If $T_1 = [F_{N,W} \ L_2]$ and $T_2 = [F_{N,W} \ L_1]$ then a fast projection onto the range can be determined by multiplying the vector by $$T_2 T_1^*.$$

In the uniform case, $L_1$ and $L_2$ can be calculated explicitly and consequently derive tight bounds on the error term.

Similar results can be obtained under non-uniform sampling schemes. As was recently shown in [6', 7', 14'], the discrete-time spectral concentration problem converges to its continuous-time analog when the sampling grid becomes arbitrarily fine. The DFT operation and low-rank correction have an analog on the continuum as a Fourier series and some small number of correction functions. For non-uniform sampling schemes, the continuous functions can be sampled at different points in accordance with the same formulation. Because the basis functions can lose their orthogonality when the sampling is performed non-uniformly, the non-uniform set operation can be expressed as $$S_{N,W} HH^* S_{N,W}^* = \underbrace{F_{N,W} \tilde{H} \tilde{H}^* F_{N,W}^*}_{(NDFT\ vectors)} + \underbrace{L_1 L_2^*}_{(Low\ rank)} + E,$$

where H and $\tilde{H}$ orthogonalize the non-uniform Slepian and DFT vectors, respectively. For a Slepian space having a K-dimensional projection where K<<M, then the matrix $\tilde{H}$ can be expressed as K×K and therefore is small. Furthermore, existing algorithms for computing fast non-uniform DFT operations can be performed for standard DFT [17'] to provide substantial computational savings. In addition to this computational benefit, the elements of the NDFT matrix can be unimodular, which is beneficial in a number of applications. While the low-rank operations may not share this property, they are few and number.

A method for efficiently recovering the uniformly spaced Nyquist rate samples from a set of nonuniformly spaced samples was devised in [15']. In particular, the method in [15'] took a set of non-uniform sample y and a sinc interpolation operator A and solved the Tikhonov regularization problem:

$$\text{minimize}_{x \in l_2(Z)} \| y - Ax \|_2^2 + \delta \|x\|_{l_2(Z)},$$

to produce the on-grid samples x via conjugate gradient descent (CGD). Because the samples lie in a low dimensional Slepian space, [15'] was able to show that CGD converges to the desired tolerance in relatively few iterations. The exemplary system and method can reconstruct large frames of data at a similar modest computational cost.

For a system having 5.5 GHz bandwidth at a center frequency of 28 GHz incident to a 32×32 UPA, each snapshot of the signal can be determined to approximately lie in a 9-dimensional Slepian space that is temporally undersampled at 1.28 GHz. The system can first embed each snapshot in a low dimensional Slepian space (or other subspace described herein) and recover the non-uniform samples. The fast recovery algorithm can then be executed to produce the Nyquist samples from this set of reconstructed non-uniform samples.

Example #4—Temporal Decimation

By receiving coefficient signal y(t) as a vector of samples from a bandlimited signal, each snapshot can represent a sampling of the underlying signal over an interval $A_e/c$. The sampling rate over this interval can be determined by the incident angle of the signal and array spacing. Furthermore, this spatial sampling rate is far larger than the underlying Nyquist rate leading to a highly redundant sampling of the signal.

Figure 7A:
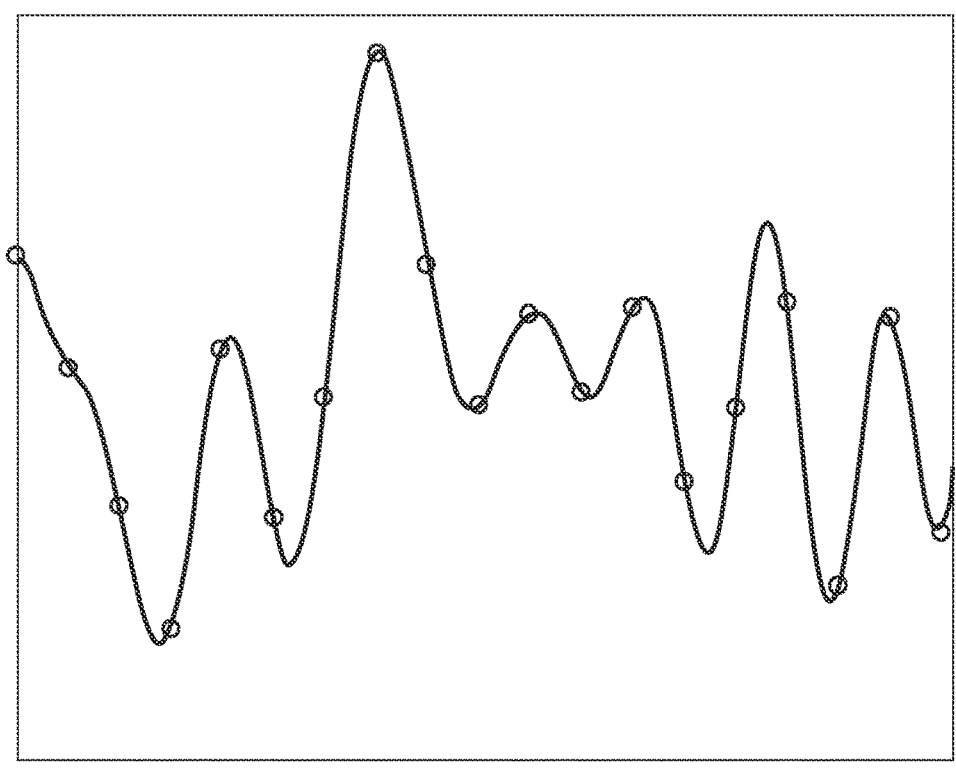
FIGS. 7A, 7B, and 7C illustrate the operation of the exemplary system and method for a uniform array in accurately representing a signal even when sampling at a reduced rate and that the sampling at the reduced rate is invariant under the angle of incidents due to the geometry of the array.
Figure 7B:
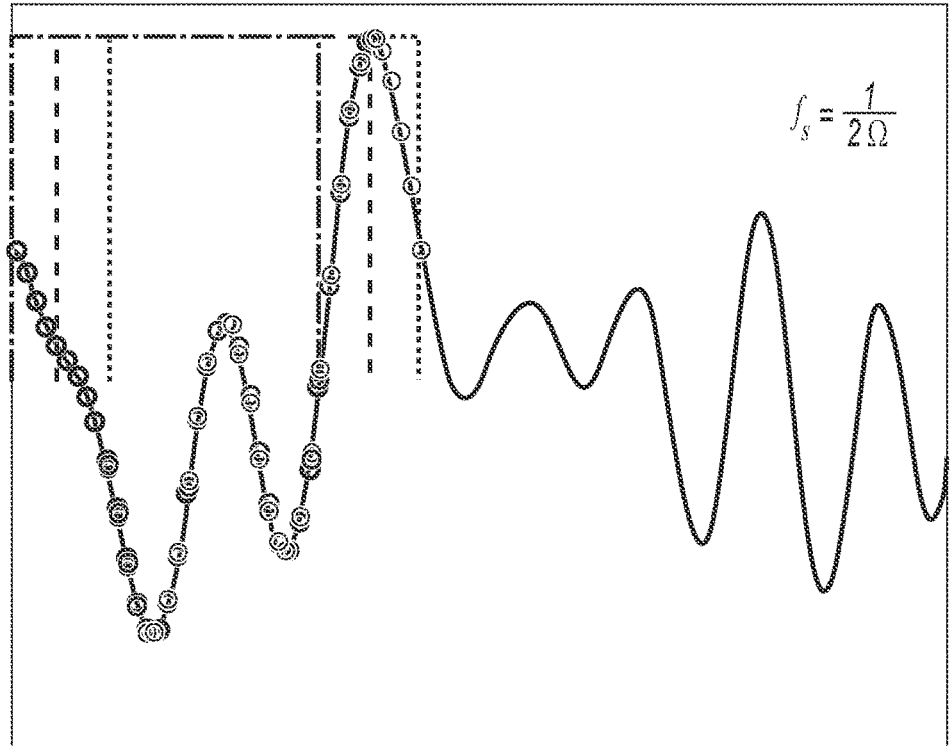
Figure 7C:
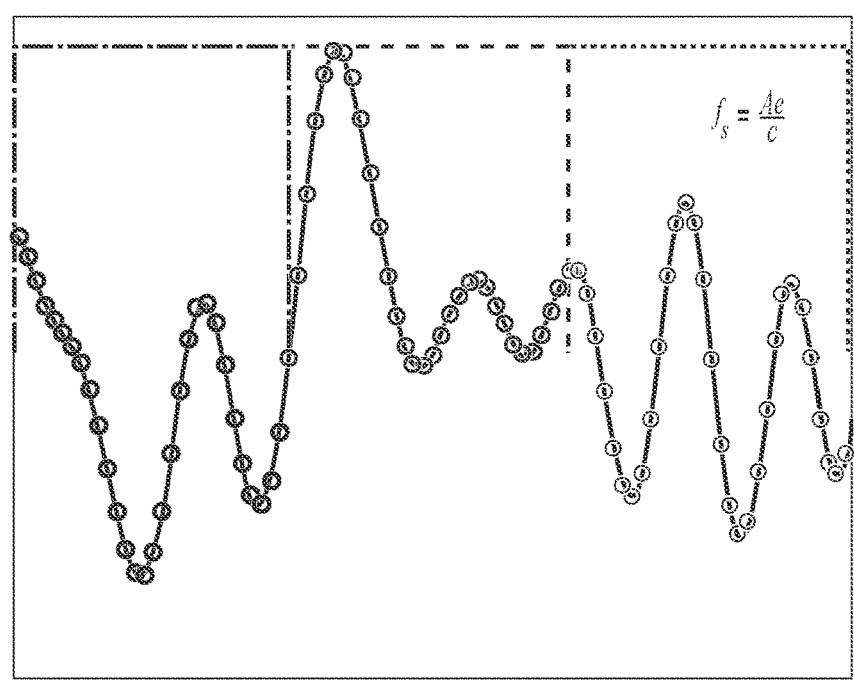

FIGS. 7A, 7B, 7C show the use of spatial sampling rate to provide a redundant sampling of the signal. In FIG. 7A, it can be observed that the array snapshot has highly redundant samples compared to the Nyquist samples. FIG. 7B shows the Nyquist rate. FIG. 7C shows a rate proportional to the effective aperture. In FIGS. 7A-7C, a 32-element ULA was employed along with an underlying subspace dimension of 7.

Indeed, the figures illustrate the use of the exemplary system and method in reducing the spatial array readout by embedding in a Slepian subspace or other subspace. Because the exemplary system and method are sufficiently sampling the signal over an interval $A_e/c$ with each snapshot, the system does not need to produce a snapshot at every Nyquist interval $T_s = 1/2\Omega$. Indeed, the system can temporally sample at the decimated rate $T_d = A_e/c$ to accurately reconstruct the signal (while the decimated rate at the Nyquist rate would be $T_d/T_s = 2A_e\Omega/c$), which can be exactly the number of linear combinations taken across the array. Hence, if the exemplary system and method sample temporally at the decimated rate, the system can supplement the apparent loss of information with spatial samples. The tradeoff is that the system may lose the ability to coherently average out in-band noise since the coherent averaging leverages the redundancy used to reduce the sampling rate. However, by reducing the sampling rate by a factor proportional to the spatial subspace dimension, the system can be configured with drastically reduced ADC sampling requirements as a significant amount of the noise may be attributed to the ADC. In addition, with fewer ADCs, higher quality ADCs with increased ENOB, may be used to provide additional compensation.

Because planar and linear arrays of the spatial subspace dimension can be highly dependent on the angle of incidents, signals coming in at broadside may have a spatial subspace dimension of one, while for signals coming from broadside, the dimension can be far higher. To leverage the decimated sampling scheme for these arrays, a variable sampling rate ADC may be employed in which critical sampling is performed from the broadside. Alternatively, a conformal array may be used.

Figure 8A:
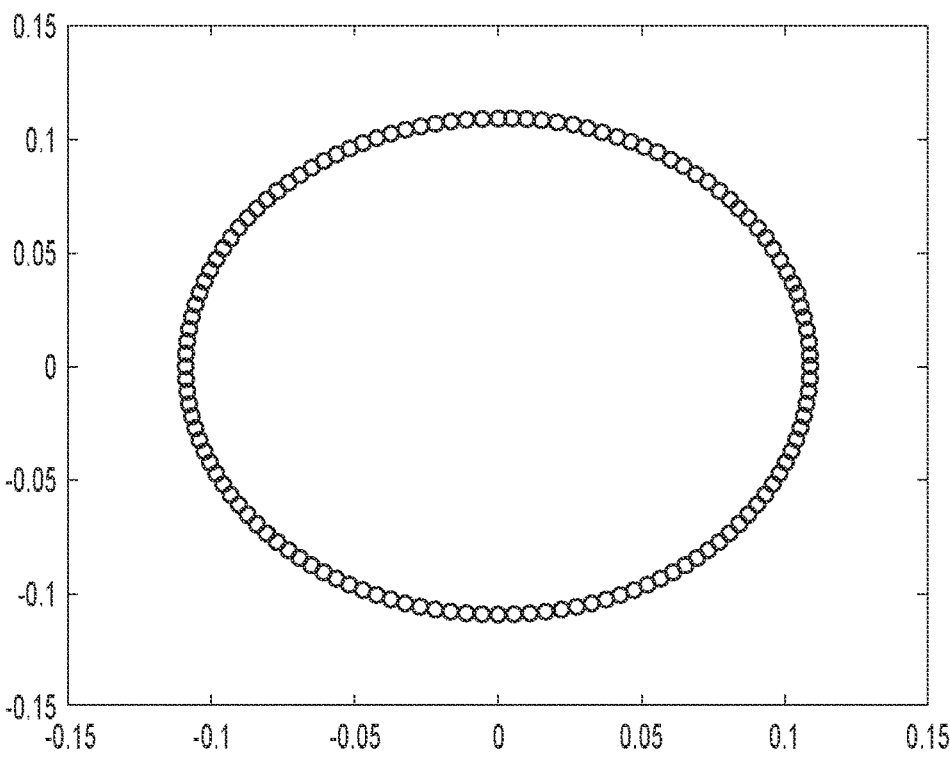
FIG. 8A illustrates an example circulate beamforming array that can be coupled to the exemplary system and method in accordance with an illustrative embodiment.
Figure 8B:
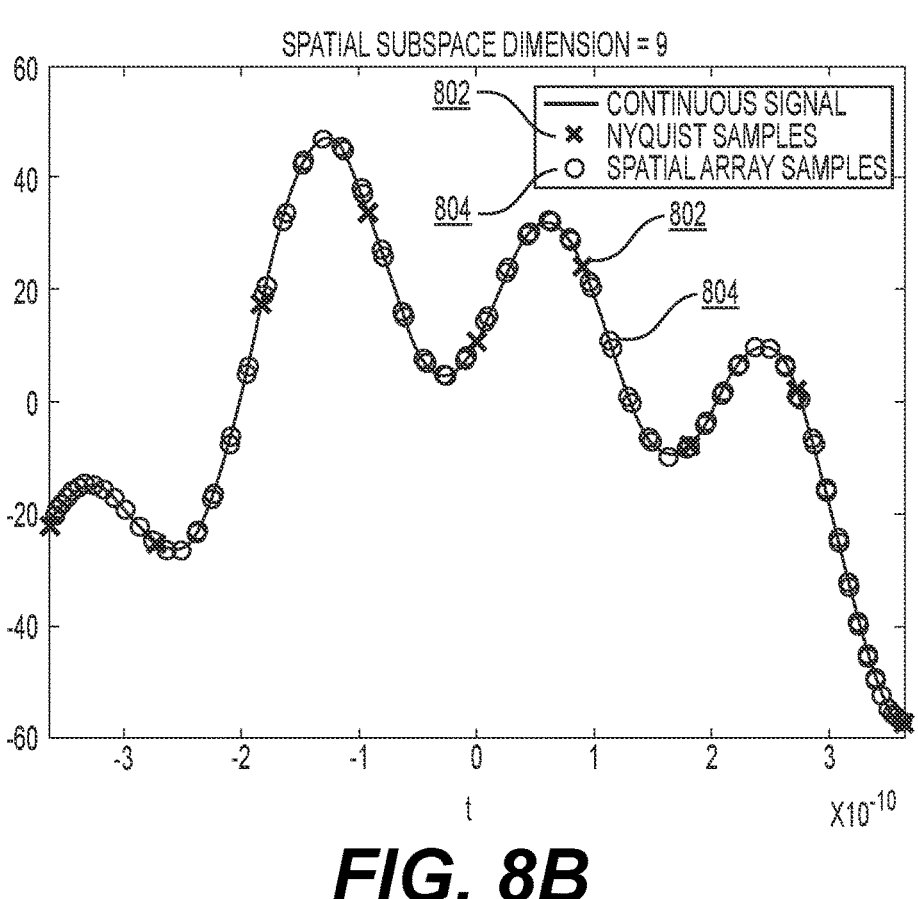
FIGS. 8B and 8C illustrate the operation of the exemplary system and method for the array of FIG. 8A in accurately representing a signal even when sampling at a reduced rate and that the sampling at the reduced rate is invariant under the angle of incidents due to the geometry of the array.
Figure 8C:
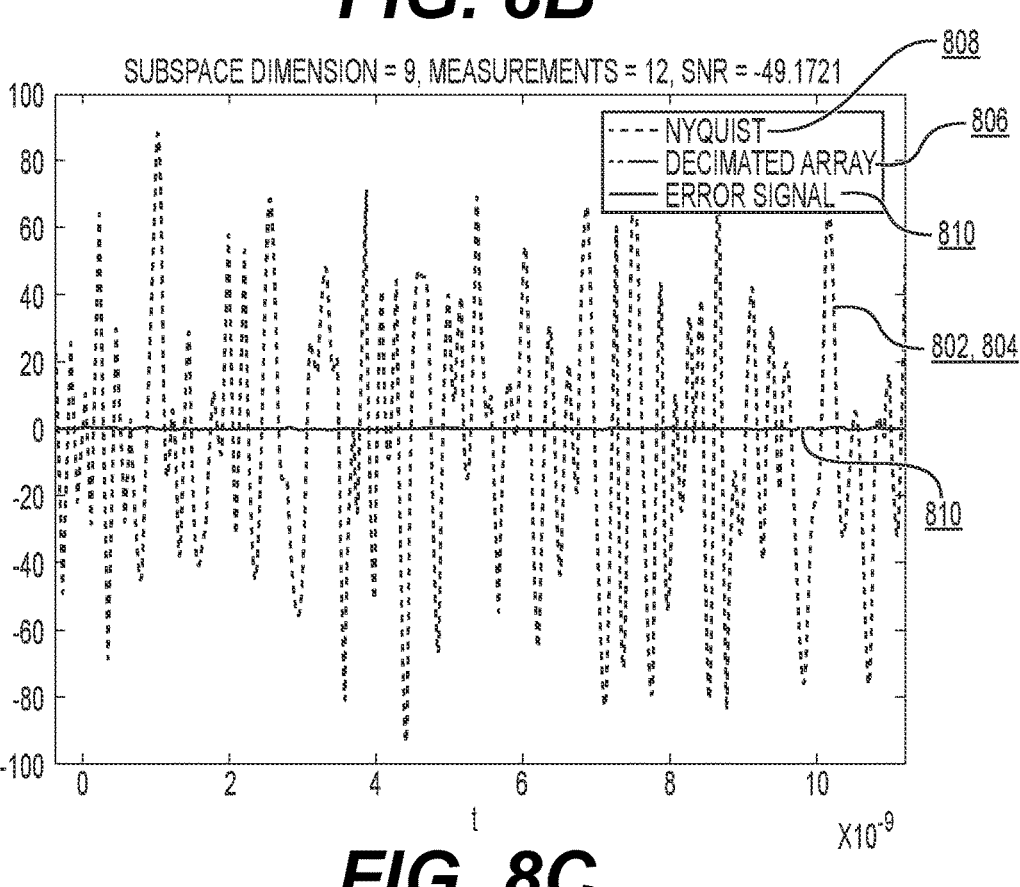

FIGS. 8A-8C show the ability of the exemplary system and method to accurately represent a signal even when sampling at a reduced rate and that the sampling at the reduced rate is invariant under the angle of incidents due to the geometry of the array. In FIG. 8A, a circular geometry array. The circular array includes 125 elements placed at a $\lambda/2$ spacing for $f_c = 28$ GHz, having a bandwidth 5.5 GHz.

FIG. 8B shows a snapshot acquisition of the array (shown as signal 802) as compared to the Nyquist rate samples (shown as signal 804). The Nyquist rate samples were acquired, in comparison, at 11 GHz. Notably, by leveraging the redundancy of the exemplary system and method, the sampling rate can be reduced by a factor roughly equal to the spatial dimension such that $f_s = 1.38$ GHz. Indeed, the exemplary system and method can encode each snapshot in a Slepian subspace of dimension 9 to reduce the array readout. In addition, if the Slepian subspace of dimension is increased, say, to 12 to boost reconstruction accuracy, the system can employ 12 ADCs sampling that still operates at a reduced rate to acquire the signal.

FIG. 8C shows a reconstructed signal (shown as signal 806) compared to the Nyquist rate samples (shown as 808) along with the error (shown as line 810) between the two. The reconstructed signal has very little distortion compared to its Nyquist rate samples.

Experimental Results and Example

Simulations have been performed to evaluate the viability of the exemplary system and method and to characterize its performance.

Signal Model and Parameters. For the simulation, a sum-of-sinusoids method of bandlimited signal generation was performed for a set of simulations. In this evaluation, a signal is assigned a center frequency $f_c$ and bandwidth W, a set of P frequencies are then randomly drawn such that $f_p \in [f_c - W, f_c + W]$. The signal is then generated by summing the sinusoidal tones at each of these frequencies for $$x(t) = \sum_{p=1}^{P} \alpha_p e^{i2\pi f_p t}$$

where $a_p$ are complex-valued coefficients drawn from an i.i.d. distribution. The signal is then sampled at an appropriate frequency to generate the digital receiver signal. Because the sum of sinusoid's model can be impacted by frequency leakage, since it is not designed to be particularly spectrally concentrated, it is a fairly good model for displaying the benefits of the Slepian basis.

In the simulation, each of the x(t) is delayed based on the angle of arrival, which, unless otherwise specified, is set to a conservative $\pi/2$. This represents the most adverse scenario for beamforming since, at this angle, it has the highest dimensionality. For simplicity, the experiments were performed on a 32-element uniform linear array (ULA). To mimic the state-of-the-art mmWave systems, the signals center frequency is set to $f_c = 30$ GHz, and consequently, the spacing of the ULA is set to $\lambda/2 = c/2f_c$. The bandwidth W was varied between experiments.

Figure 5A:
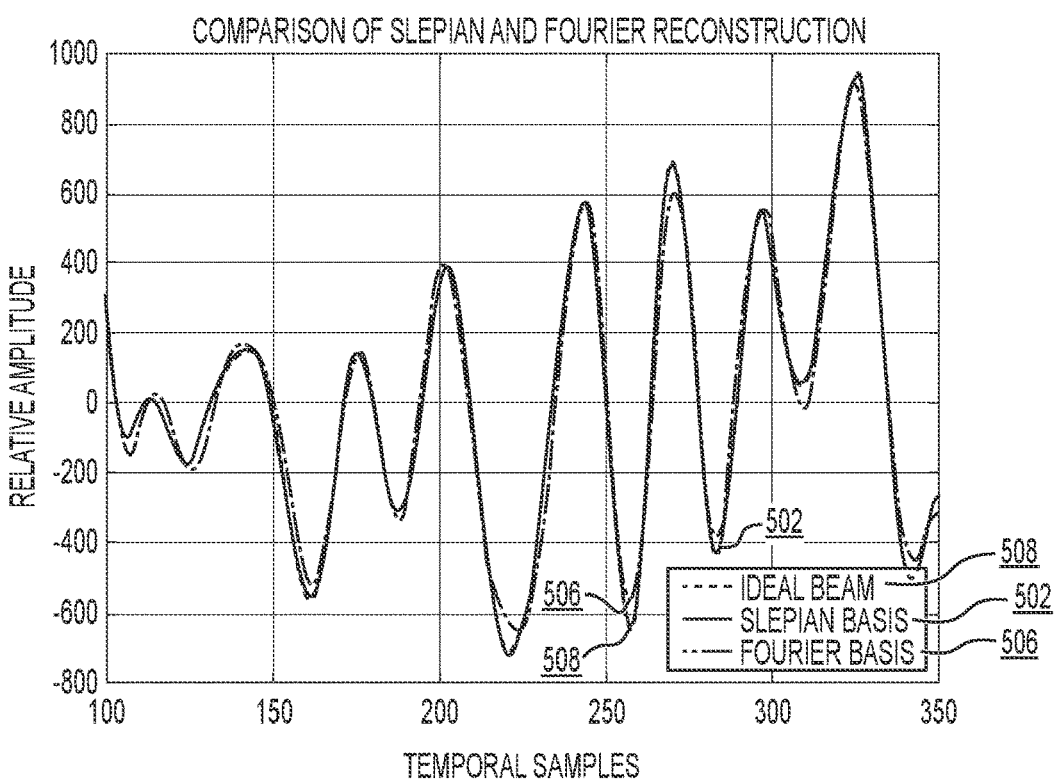
FIGS. 5A and 5B show the performance of the exemplary system and method performing the multiple projection demodulation by comparing a reconstructed beamformed signal generated using the Slepian basis to an idealized reconstruction in accordance with an illustrative embodiment.
Figure 5B:
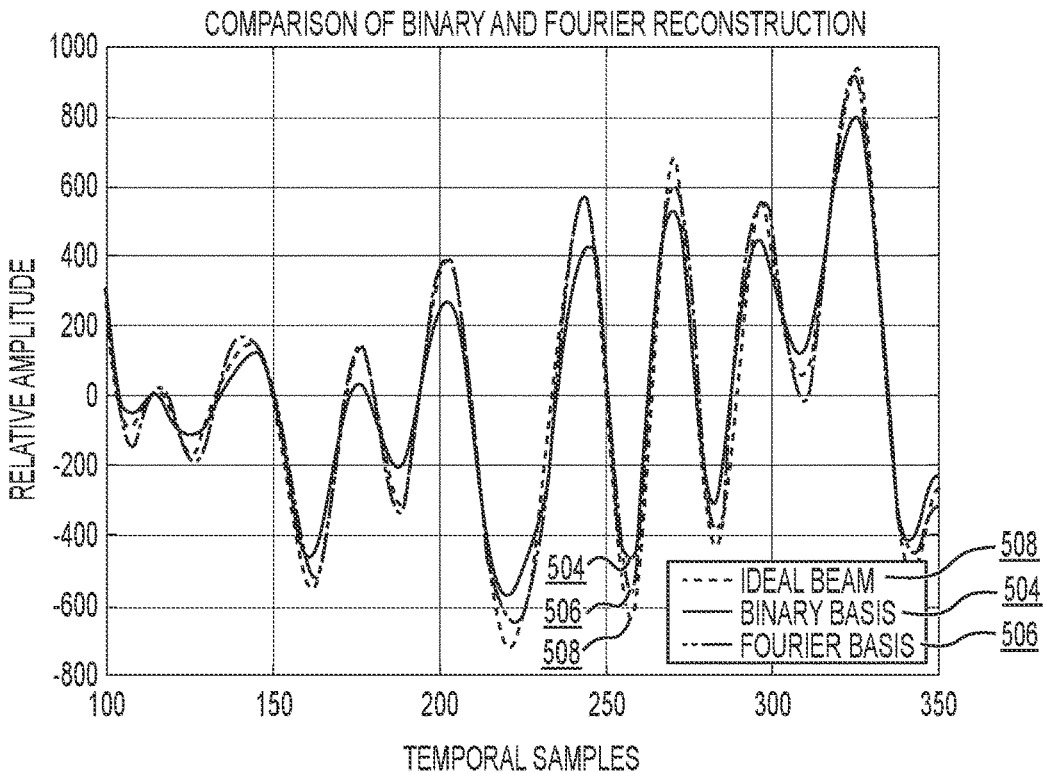

32 element array results. FIGS. 5A and 5B show the performance of the exemplary system and method performing the multiple projection demodulation by comparing a reconstructed beamformed signal generated using the Slepian basis (shown as signal 502 in FIG. 5A) or Binary basis (shown as signal 504 in FIG. 5B) as compared to a Fourier basis (shown as signal 506) or an idealized beam signal (508). The signals were simulated with a spatial dimension of 5 for a 32-element array having 9.375 GHz bandwidth (about 31.25% of the center frequency). It can be observed in FIGS. 5A and 5B that qualitatively the exemplary system and method using the multiple projection operation can provide comparable reconstructions to standard broadband methods. Notably, the experiment shows that the exemplary system and method using 6 ADCs can perform can provide similar performance at 18.75%, the number of ADCs normally used for true-time delay operators.

32×32 element array results and Temporal Decimation. A second set of simulations was conducted to evaluate the performance of the exemplary system and method with an unperturbed signal incident to a 32×32 element UPA. The analysis employed a Slepian space of dimension of 5 that conforms to the rank determination provided in Equation 5.

Figure 6A:
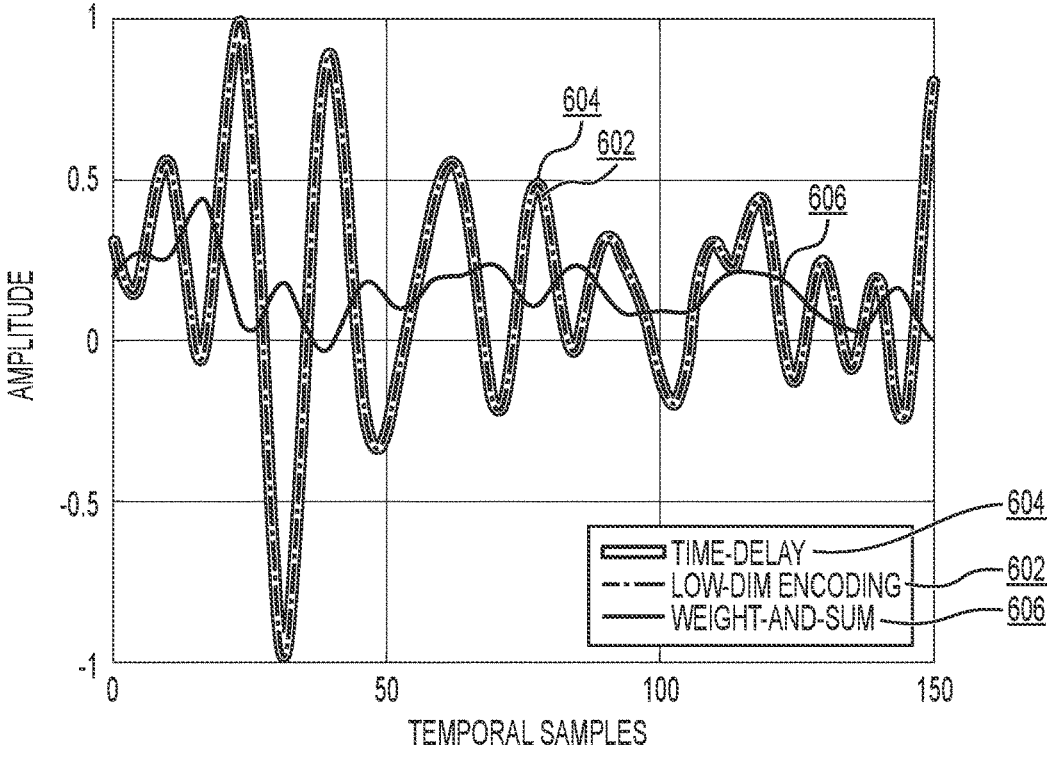
FIG. 6A shows a qualitative comparison of a reconstructed output of a signal beamformed via Slepian measurements as compared to an idealized model and hardware.

FIG. 6A shows a reconstructed output of a signal beamformed via Slepian measurements (shown as signal 602) as compared to a beamformed signal recovered using a true time delay operator (shown as signal 604) and a weight-and-sum operator (shown as signal 606). It was qualitatively observed that the signal beamformed via Slepian measurements (602) is identical to the true time delay (604).

Figure 6B:
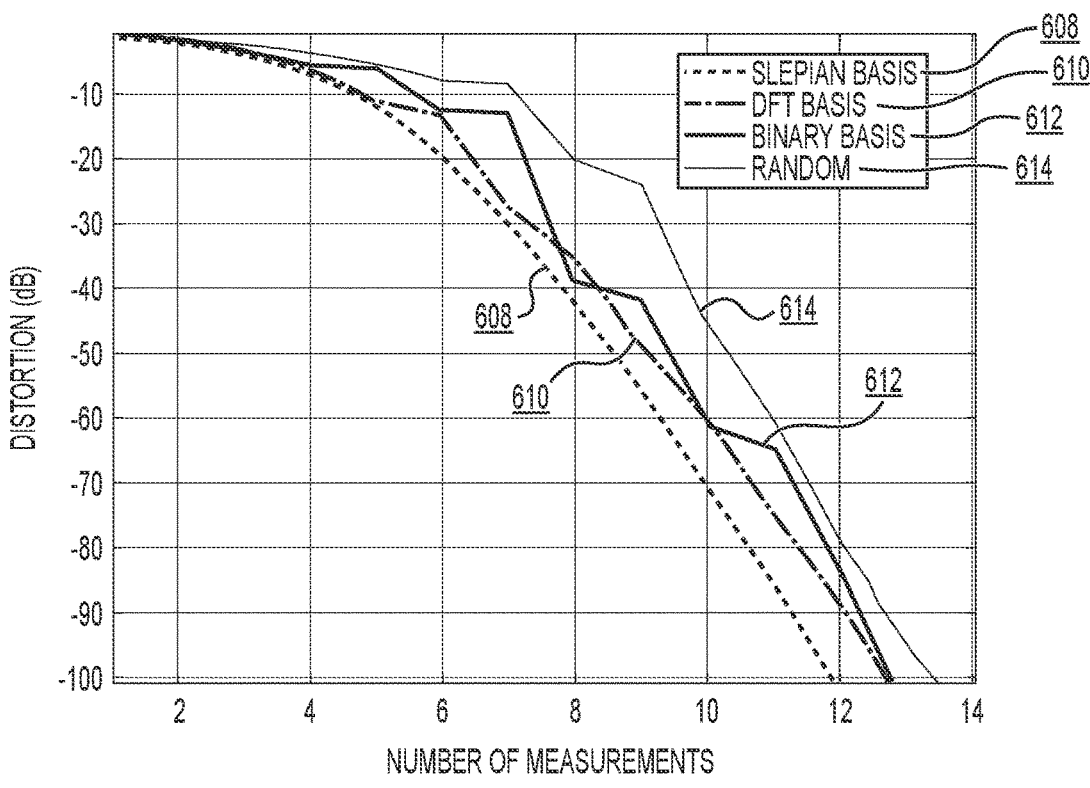
FIG. 6B shows simulations results to evaluate the performance of the exemplary system and method for different types of the measurement basis and with respect to the number of measurement channels employed for the evaluated array in accordance with an illustrative embodiment.

FIG. 6B shows simulations results to evaluate the performance of the exemplary system and method for different types of the measurement $\Phi$ with respect to the number of measurement channels employed for the evaluated array. In FIG. 6B, the plot shows a comparison of the resulting mean distortion of a signal reconstructed from a measurement $\Phi$ using the Slepian basis (608), the DFT basis (610), the Binary basis (612), and a random (Gaussian) basis (614). It can be observed that as the number of measurement stages is increased, all four methods were able to achieve low levels of distortion.

The distortion $\|y_0 - \bar{y}\|$ shown in FIG. 6B indicates that ideal Slepian measurements achieve exceptionally low distortion as the number of measurements approaches the underlying subspace dimension. The alternative measurement schemes are able to achieve similar levels of low distortion but require the number of measurements to exceed the subspace dimension by a modest amount. Hence, we can achieve analogous performance at the cost of oversampling.

Figure 6C:
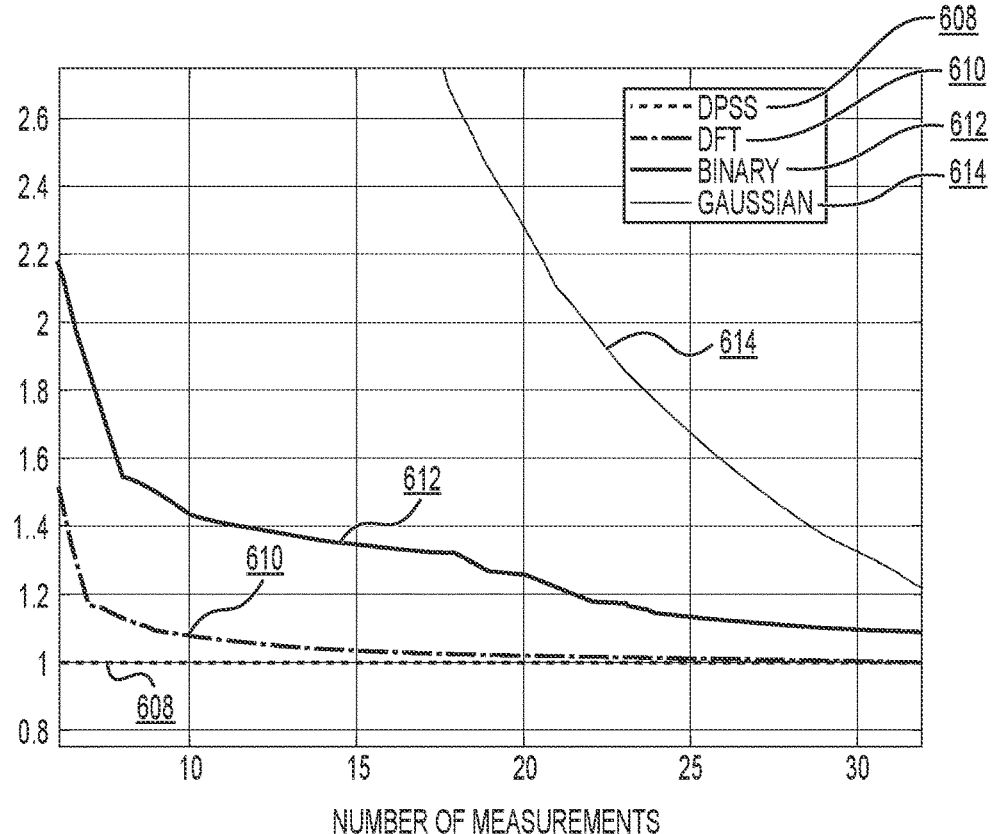
FIG. 6C shows simulation results to evaluate conditioning metrics for the different types of the measurement 1 with respect to the number of measurement channels in accordance with an illustrative embodiment.

FIG. 6C shows simulation results to evaluate conditioning metrics for the different types of measurement $\Phi$ with respect to the number of measurement channels. Specifically, to evaluate the measurement basis $\Phi$ under arbitrary perturbations, the study examined the metric $$\frac{1}{K} \text{trace} \left( \Phi S^\dagger \Phi S \right) = \frac{1}{K} \sum_{k=1}^{K} \frac{1}{\sigma_k^2}$$

proportional to the expected perturbation error when $\eta$ is random. In the ideal case, each singular value of $(\Phi S)^+$ will be "1" such that the above is "1" as well, which equates to a minimal error due to perturbation. Values larger than "1" indicate amplification of the perturbation error. For a variety of choices in $\Phi$ this desired behavior will only be achieved through an increase in the number of measurements. In FIG. 6C, it can be observed that each of the measurement $\Phi$ using the Slepian basis (608), the DFT basis (610), and the Binary basis (612), was able to drive this metric close to "1" given a sufficient number of measurement stages that is substantially less than the number of array elements (1024 elements).

Figure 5C:
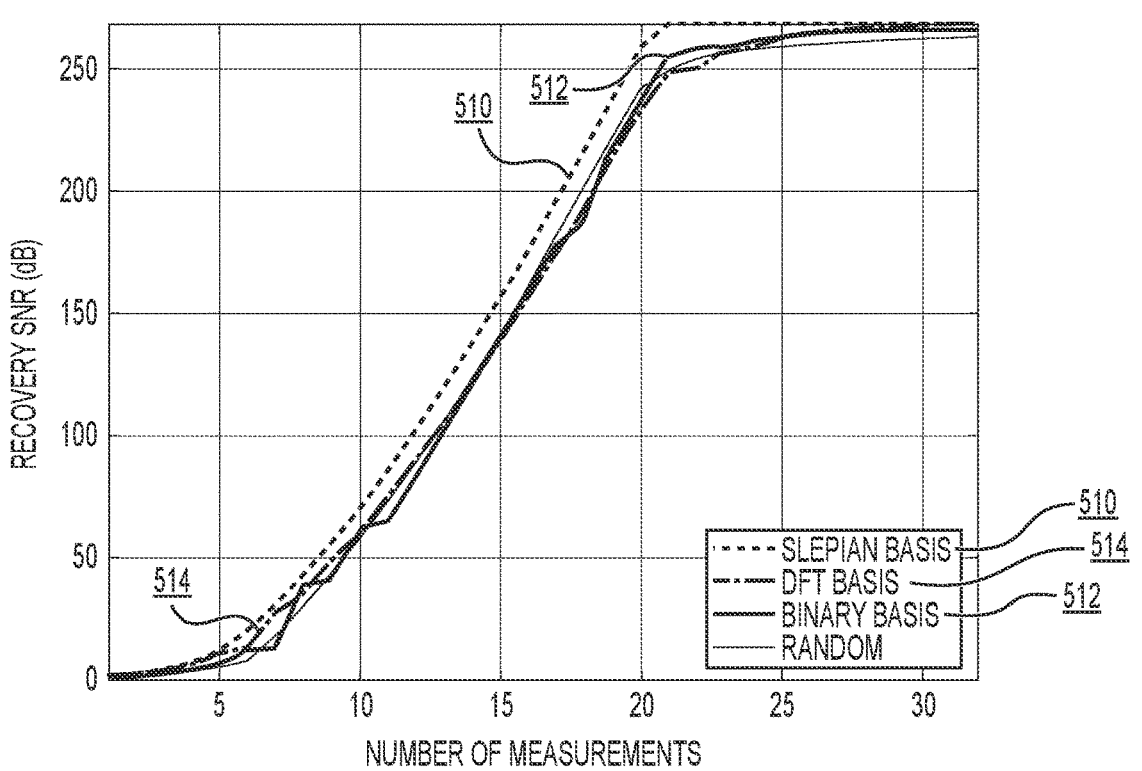
FIG. 5C shows an example SNR performance of the exemplary system and method with respect to a varying number of projections for different types of measurement basis in accordance with an illustrative embodiment.

SNR. FIG. 5C shows the performance of the exemplary system and method with respect to signal-to-noise ratio for varying number of projections (i.e., subspace dimension) for Slepian basis (510), binary basis (512), and DFT basis (514). In the analysis, the reconstructed digital array matrix $\hat{X}$ was then compared to the true matrix X in which X is assumed to be the result when an ADC had been placed at each antenna input. The recovered signal-to-noise ratio (SNR) was defined as:

$$SNR = \frac{\|X\|_F}{\|X - \hat{X}\|_F}$$

where $\| \ \|_F$ is the Froebenius norm. In the simulation, the same signal parameters used in the simulation corresponding to FIGS. 5A and 5B were used. In the simulation, because the signals were generated at random, the recovered SNRs were averaged over 100 trials per number of projections. In FIG. 5C, the SNR is observed to monotonically increase with an increased number of basis vectors. Notably, it is observed that the Slepian basis was significantly more efficient at capturing the signals. This is likely attributed to the suitability of the Slepian basis in capturing leaked frequency energy.

Fast Slepian computation. Simulations were also performed to evaluate the performance of the Fast Slepian computation by comparing the True Nyquist rate samples to the non-uniform samples reconstructed from both the limited array readout and the CGD descent algorithm. In the evaluation, a window of 3072 non-uniform samples was employed. It was observed that the Fast Slepian computation could provide a recover SNR of 60 dB, and the CGD had quickly converged in 26 iterations. It was concluded that the Fast Slepian computation could quickly resolve the Nyquist rate samples to within a modest error while traditionally under-sampling the data.

Figure 9A:
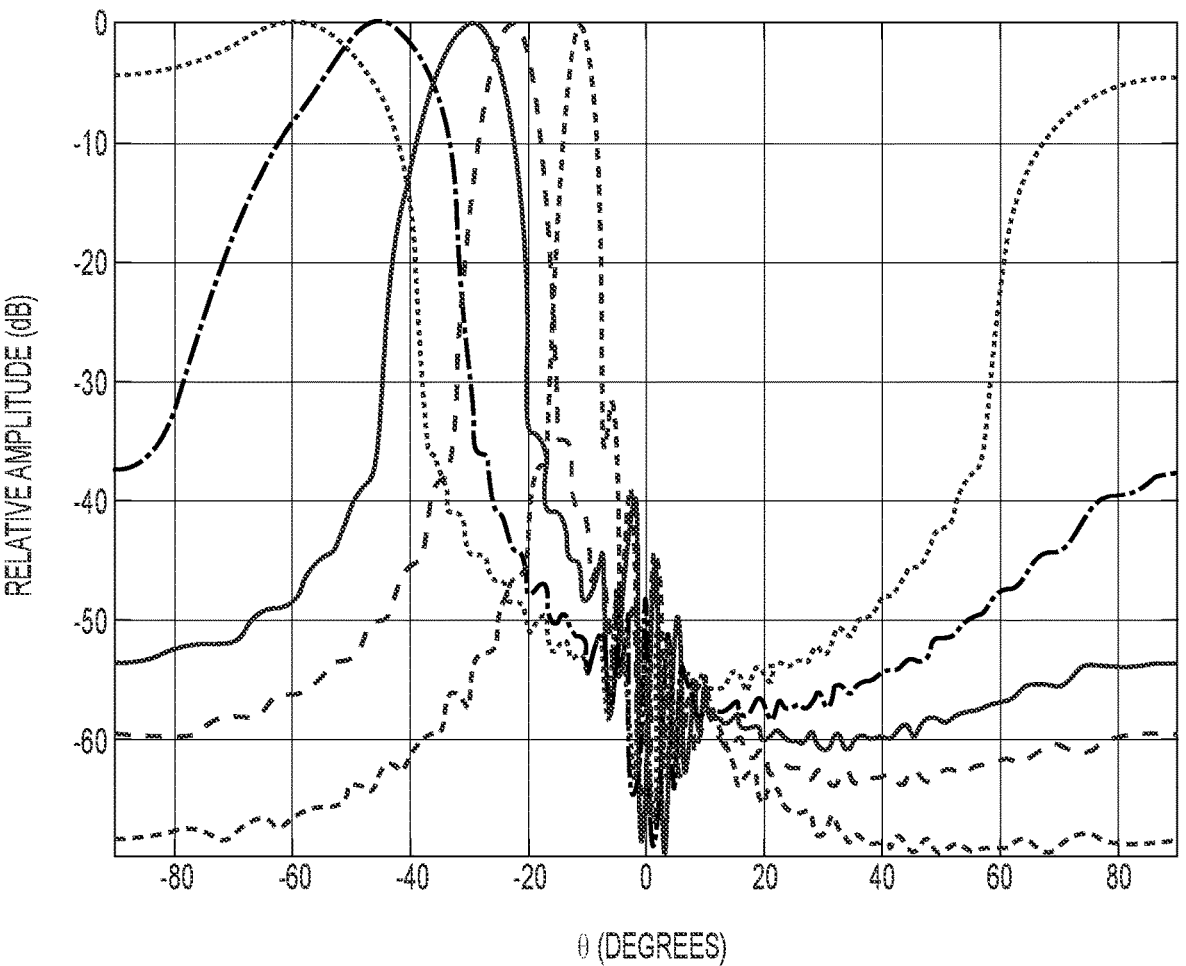
FIGS. 9A, 9B, and 9C show results of numerical experiments performed to evaluate the performance of the exemplary system and method with respect to interferer rejection.
Figure 9B:
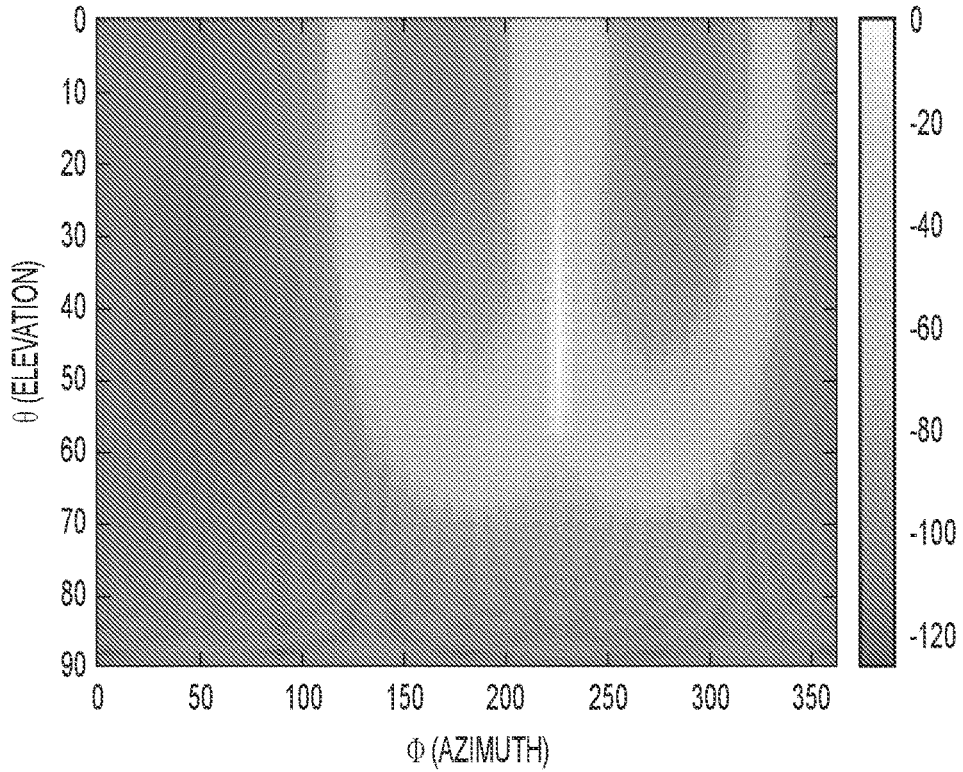
Figure 9C:
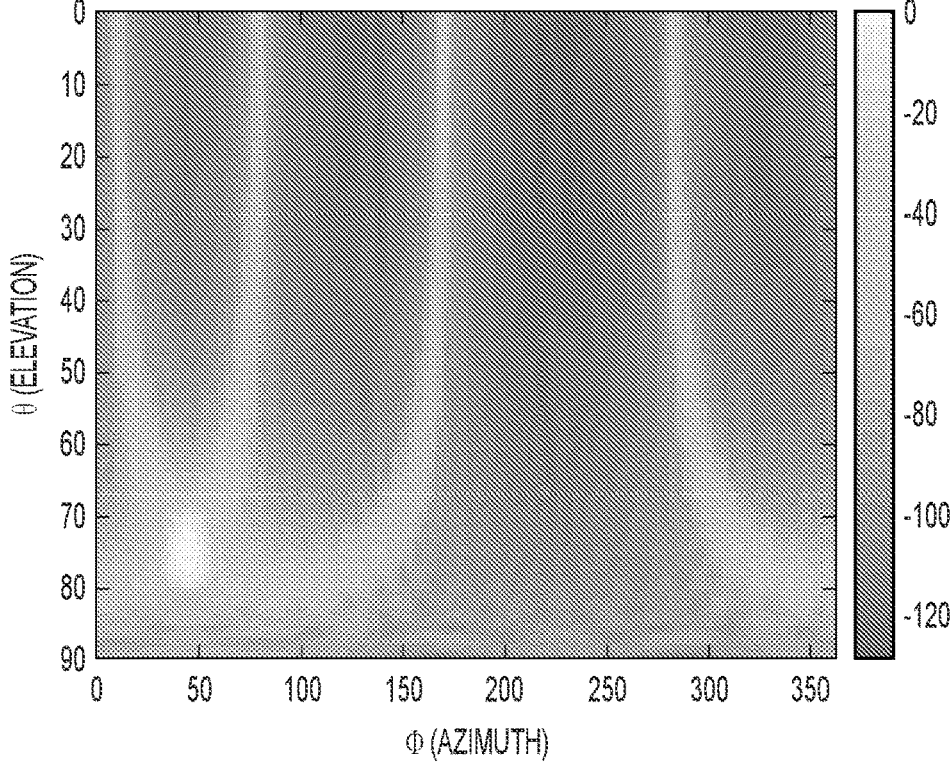

Interferer Rejection. Numerical experiments were also performed to evaluate the performance of the exemplary system and method with respect to interferer rejection. FIGS. 9A-9C shows the results of these numerical experiments. FIG. 9A shows the expected energy $$\mathbb{E}\{\|\Phi x\|_2^2\}$$

of signals incident at various angles for a variety of beamformers fixed to different angles. FIG. 9B shows a 2D beamformer at an azimuth of 225° and elevation of 45°. FIG. 9C shows a 2D beamformer tuned to an azimuth of 45° and an elevation of 75°. It was observed that for a dimension on the order of the spatial-bandwidth product, the isolation is high for all but the set of angles close to beamformer's steered angle.

Discussion

The exemplary method may be the first that leverages a sparsity inducing low-dimensional encoding under a Slepian subspace constraint to perform hybrid broadband beamforming. There is a multitude of benefits to this formulation that can give it advantages over existing architectures. To begin, it produces a highly interpretable result that allows designers to determine the degrees of freedom of a system based on the array geometry and expected operating conditions. It then provides a framework for broadband signal acquisition where the number of measurements (RF chains) is of the same order as the spatial degrees of freedom. Of interest is that under this model, the degrees of freedom in multi-dimensional arrays can scale with the aperture, not the number of elements, leading to an immense reduction in the number of RF chains compared to the work of [18].

Another strength of this method is its measurement flexibility and loose signal constraints. It does not matter what the signal waveform is so long as it is bandlimited. The signal is implicitly time-limited by the array's finite spatial extant, and therefore approximately lies in a Slepian subspace. Furthermore, the basic functions of the Slepian space are particularly apt at dealing with spectral leakage, and thus we require no constraint on the DOA to ensure a sparse representation.

The exemplary method may be viewed as posing the reconstruction problem as a standard recovery from oblique measurements. Therefore, the instant scheme allows for a variety of measurement types to be implemented at the cost of additional RF chains. This allows the design to be adjusted to meet whatever hardware constraints are present, and it may mean it is directly applicable in MIMO precoding schemes as opposed to just beamforming.

Ultimately, the exemplary method represents a significant paradigm shift from the standard approach to this problem. Virtually all beamforming techniques fundamentally work by trying to approximate a true time delay by a phase shift. When the signal is narrowband, this makes sense, but for broadband signals, it may not be a good approximation to a delay. As previously mentioned, the latter case is generally dealt with by either explicitly applying varying phase shifts to different frequency components or widening the beams such that a similar process is done implicitly. In either case, this is still fundamentally trying to find an approximation to a true-time delay operator in terms of a composition of phase shifts. The exemplary method is not concerned with such an approximation; the exemplary method seeks to use the hardware elements to reconstruct the time-shifted signal samples directly. In a sense, instead of approximating a time-shifting operator, the exemplary system and method are approximating the time-shifted samples themselves. For a transmitted and received signal, this can manifest as expanding or embedding the time-shifted signal on an appropriate basis respectively. This approach is powerful in the sense that it allows us to precisely characterize the signal and subsequently produce broadband beams in a principled manner.

Limits of classical beamforming. While frequency or temporal domain are readily considered in a modern communication system, "spatial" dimensions using spatial filtering and/or "beamforming" over multiple antennas have been explored in MIMO communications and RADAR. However, as these technologies have become more prevalent, there are ever harsher demands for faster, cheaper, and more efficient devices—a paradox for designers where there is a simultaneous requirement for more antennas, fewer components, and higher efficiency. These requirements are particularly harsh to tailor the spatial domain to meet specific demands.

In its simplest form, beamforming can be achieved through careful delays of a received signal at each antenna in front-end hardware. Such an operation is agnostic of bandwidth, but implementing a true time delay operator in hardware at high frequencies can be exceptionally difficult. An alternative to design can employ digital processing at the backend to perform computations in the digital domain. Classically this can involve placing an ADC at each antenna and leaving the spatial filtering to the digital backend. This is a powerful method that greatly enhances the versatility but is often impractical since it requires a large number of ADCs. In most practical scenarios, a weight-and-sum beamformer is employed that operates on a narrowband assumption. However, as bandwidth to the signal grows in a given application, the narrowband assumption becomes a narrowband approximation and begins to fall apart.

For example, for an M element antenna array, the total received signal can be represented as a vector $x_c=[x_1(t), x_2(t), \ldots, x_M(t)]^T$, where $x_m(t)$ is the signal received at the mth antenna element. The two most prevalent methods of beamforming are true time delay and weight-and-sum, which each make different assumptions on the structure of $x_m(t)$.

True Time Delay. In true time-delay systems, the only assumption made on $x_m(t)$ is that each element receives a delayed version of the underlying signal x(t) such that xc takes the form: $x_c=[x(t-\tau_1), x(t-\tau_2), \ldots x(t-\tau_M),]^T$. For the structure of the array for a given angle of arrival, it can be deduced the time delay $\tau_i$ for each element. For an operator $\Delta_\tau$ that time delays a signal by $\tau$, then to form a beam, this operator can be applied to the signal received at each element in which $$\tilde{x}(t) = \sum_{m=1}^M \Delta_{\tau_m} x(t - \tau_m).$$

Indeed, this will result in the signal being coherently added, yielding a gain of M. Similarly, in the event, the signal is corrupted by i.i.d. gaussian noise, the SNR will be increased by a factor of M as well.

This classical method is generally agnostic of the signal bandwidth. However, implementing a true time delay in hardware is a particularly difficult task. Even if the level of resolution is achieved, the devices often tend to be powerintensive and still require the addition of phase-shifters to get full array gain. If assumptions are made on x(t), a similar level of performance may be achieved with only phase-shifters.

Weight and sum. Suppose there is a signal that is known to be approximately narrowband such that $x(t) \approx e^{j2\pi f_c t}$, then the total received signal can be modeled as: $x_c = [e^{j2\pi f_c t} e^{-j2\pi f_c \tau_1}, e^{j2\pi f_c t} e^{-j2\pi f_c \tau_2}, \ldots, e^{j2\pi f_c t} e^{-j2\pi f_c \tau_M}]^T$, or more compactly, $x_c = e^{j2\pi f_c t} e_{fc}$. By applying phase-shifters (weighting) at each element and then summing, the operation can be stated as an inner product of $x_c$ and a sinusoidal vector $\hat{e}_f$ in which $\langle x_c, \hat{e}_f \rangle \leq M e^{j2\pi f_c t}$ per the Cauchy-Schwartz inequality and only reach equality when $f = f_c$. Therefore, it can be observed that the same level of performance of a true time-delay system can be achieved using phase-shifters, assuming the signal is narrowband.

The benefit of this narrowband assumption is that true time-delay operators do not need to be implemented. Further, phase-shifters are significantly easier to implement and work across a far greater range of frequencies. This simplification comes at a cost: as the signal's bandwidth grows the assumption falters and will ultimately fail to match performance with true time delay systems.

Literature Review Discussion. With the advent of massive MIMO and 5G systems, work in the field of broadband beamforming has been rapidly progressing to meet the new demands of next-generation systems. However, to the best of the inventor's knowledge, the powerful and concise mathematical modeling yielded through the study of Slepian spaces has not yet been realized in the realm of spatial array processing. On the other hand, the notion of utilizing multiple measurement schemes in an RF frontend has long been studied in the context of hybrid MIMO precoding.

The goal of MIMO precoding is to spatially and temporally encode a transmitted signal in such a manner that it can be reliably decoded by a receiver after navigating some communication channel. Following from a series of review papers [2] [1], it is clear that the recent focus of these techniques has been the implementation of hybridized systems. Such systems leverage a reduced number of RF chains to perform the same task as fully digital precoding and manifests as a multi-measurement system. On the surface, this type of hardware is analogous to what the exemplary method would require. The key difference in the exemplary method is the underlying mathematical model from which the system chooses the type and number of measurements. Since the exemplary method hinges on the existence of a sparse encoding, other works that have noted this property are first discussed. The notion of spatially sparse in MIMO signals has been noted by [2] as an area that has not been well explored in hybridized systems. Ayach et al. makes use of a spatial sparsity constraint to design optimal precoding schemes [5]. That work inherently relies on narrowband signals and heavily constrains the choice in subspace to reflect such an assumption. Further work by leverages spatial sparsity in terms of channel estimation. However, it relies on strict direction of arrival (DOA) constraints to ensure sparsity and fails to give a unified sparsity-inducing dictionary for a generalized signal case. Though spatial sparsity is a known phenomenon, there has been difficulty leveraging it to its full extent. Applications are largely restricted to channel estimation schemes or optimization constraints in synthesizing codebooks.

Furthermore, the relationship between the system parameters and their degrees of freedom remains vague. Since the degrees of freedom relates to the number of required RF processing chains, works that have investigated the question of how many chains are necessary are reviewed. Bogale et al. [7] attempt to address this question of degrees of freedom by relating it to the rank of the composite precoding matrix. However, this formulation is not easily interpretable in terms of parameters such as bandwidth and DOA due to the non-trivial composition of individual precoding matrices. Fundamentally that work treats the transmission of each symbol as an effectively narrowband operation, albeit with varying path losses due to frequency selectivity. An analogous result was derived in [14] but suffers from the same shortcomings as the previous. In a similar manner to the exemplary design, Zhu et al. [18] propose a unified method of subspace formulation as well as a notion of the number of necessary RF chains. The bound-on number of RF chains is given explicitly in terms of signal parameters. However, the authors explicitly decouple spatial dimensions in their proposed framework. This ultimately leads to a scheme that drastically under-utilizes the spatial sparsity of the signal. Furthermore, it does not discuss the effects of high bandwidth on these methods or address how it may affect their spatial covariance matrix formulation. In general, the majority of hybrid precoder designs require the number of RF chains to be on the order of the signals temporal dimension. This stands in contrast to the exemplary method, which requires the number of RF chains to be on the order of the drastically smaller spatial dimension. Other works such as [3] mainly deal with determining how to optimize coding schemes given a limited number of hardware elements. In these works, the number of RF chains is known a priori, and the notion of the subspace is limited to dictionaries that describe narrowband behavior.

A series of recent works have focused more directly on the issue of beamforming when the signal has substantial bandwidth. In such cases, the signal is susceptible to beam squinting, leading to a variety of problems in the digital and analog processing chains [9]. Chen et al. [8] approach the problem by coming up with an optimal beam generated from a superposition of clustered steering vectors. This effectively widens the beam such that the squinting effects can be accounted for. The work of Peng et al. [12] follows a similar methodology but generates the widened beam from a family of chirped signals due to their approximately flat spectral response. Both of these works treat the solution to broadband beamforming as essentially producing the best wide beam that encompasses all the possible frequencies. This is a fundamentally different approach, which seeks to reconstruct samples of the delayed signal and directly approximates true time delay. The notion of reconstructing samples in a more time-domain oriented approach was explored to some degree by Morsali et al. [11]. However, that work largely approaches the problem from a signal design perspective. As in previous works, it treats broadband to mean a collection of narrowband beams applied at differing frequencies, and it fails to generalize to less idealized cases.

In general, there seems to be little attention given to cases of high instantaneous bandwidth where non-idealities in subspace models persist. For signals of sufficiently high bandwidth, the corresponding covariance matrix of individual signals is no longer rank 1. This inconvenient fact makes much of the work in MIMO precoding non-trivial to extend to the true broadband case. The coupling between bandwidth and rank was noted by Zatman [17], who produced a methodology for determining when the rank of the covariance matrix exceeds one. The approach centers around an analysis of when two sinusoids become sufficiently spaced to produce a rank two covariance matrix. However, the work failed to relate the signal covariance structure to Slepian spaces and thus is a less robust model in terms of describing the behavior of signals with substantial bandwidth. Furthermore, it presents no means of dealing with the signal after the narrowband assumption fails.

The approach of the exemplary method hinges on the observation that the received signal is implicitly time-limited by the array, meaning that its covariance matrix will always be full-rank, albeit ill-conditioned [13]. This reveals an avenue through which we can both derive the definition of broadband used in the exemplary method and design a variety of robust broadband signal acquisition techniques. A common theme in the previously discussed sources is that the goal of many authors is to approximate a true time delay. This is because when a signal is incident to an array at a particular angle, different versions of the signal are being received at different times. Thus true-time delay beamforming is the optimal method that mimics the physical phenomena that are occurring and is agnostic of bandwidth. However, actually implementing a time-delay system is extremely difficult for a variety of reasons, namely resolution, power consumption, and chip size [10]. Nonetheless, a significant amount of research has been put into true time-delay systems in recent years. Jang et. al designed a baseband true-time delay unit that is meant to be used in conjunction with phase shifters [9]. Though the inclusion of phase shifters reconciles the issues of RF and baseband delays, it added another level of hardware complexity. The actual time delay operator in this paper is similar to that of Spoof et al. [15]. Both sources utilize a re-sampling technique in which the signal is delayed by varying the clock phase of a modified sampling unit. Though not nearly as cumbersome as a tapped delay line, this method still requires a significant amount of additional front-end hardware.

Overall, none of these recently developed techniques achieve the level of practicality one can with narrowband or hybrid beamformers. In terms of existing patents that bare some resemblance to the exemplary method, there are none that directly relate. Ashrafi proposed a scheme that utilizes discrete Prolate spheroidal sequences in communications [4]. In this framework, they are used as an orthogonal modulation sequence for more optimal spectral efficiency but do not relate to beamforming or precoding. The notion of leveraging redundancies in MIMO communications to procure efficient signal acquisition was examined by Baraniuk et al. [6] but was limited to temporal processing in the context of distributed compressed sensing.

Subspace Work Discussion. The notion of an underlying subspace that characterizes the behavior of a signal incident to an array was first popularized in the long celebrated MUSIC algorithm [25']. Assuming the impinging signal is sufficiently narrowband, the algorithm seeks to estimate the covariance matrix from temporal snapshots of the array. Said estimate is used to construct a signal subspace that can subsequently be used for beamforming through a linear embedding. Though this is explicitly a narrowband method, the notion of leveraging a subspace model to beamform motivated others to explore extensions to a broadband setting. In particular, the work of Buckley et al. presented a deterministic broadband signal subspace model that could then be used in a manner similar to that of MUSIC [10'] [9'] [8'].

Though often not the focal point of these works, the described subspace model can be analogous to our Slepian space representation, albeit used in a very different context. Reduced Dimension BeamSpace (RDBS) is the term generally used to describe the process of finding low dimensional representations of signals received by multi-sensor arrays [18']. Though the motivations may be similar, a limited array readout is far easier to handle with respect to several areas of processing. Again the work of Buckley et al. was able to leverage the broadband subspace model to derive an efficient method of reducing the dimension of received signals [28]. Further investigation into this methodology by Anderson showed the low-dimensional representation could effectively carry all of the information of the received signal [3']. Ultimately this shows that there was substantial previous research into how to leverage Slepian basis vectors to beamform signals with appreciable bandwidth.

The exemplary system and method distinguish itself from these previous works by utilizing a more generalized measurement system in which the linear combinations of antenna outputs can be almost arbitrary. The subspace model is then utilized as a constraint on the solution set during signal recovery, allowing for further simplification of architectures past simply reducing RF chains.

Furthermore, recent work by Karnik et al. has produced tight non-asymptotic bounds on the eigenvalue concentration of discrete prolate spheroidal sequences [14'] [16']. This bolsters the argument on the effective dimension of the broadband signal subspace. From a structural perspective, the exemplary method can use analog and digital linear operations that resemble hybrid MIMO precoding schemes [1'] [2']. Such systems leverage a reduced number of RF chains to perform the same task as fully digital precoding, and manifests as a multi-measurement system.

In a similar manner to RDBS processing, the notion of leveraging spatial sparsity exists in MIMO precoding as well. Ayach et al. makes use of a spatial sparsity constraint to design optimal precoding schemes [4']. This work inherently relies on narrowband signals and heavily constrains the choice in subspace to reflect such an assumption. Further work by [27'] leverages spatially sparsity in terms of channel estimation. However, it relies on strict direction of arrival (DOA) constraints to ensure sparsity and fails to give a unified sparsity-inducing dictionary for a generalized signal case. Though spatial sparsity is a known phenomena in MIMO, there has been difficulty leveraging it in a manner similar to the exemplary system and method.

There are works related to the concise estimation of the subspace dimension and consequently the required number of RF chains in MIMO. Bogale et al. attempts to address this question of degrees of freedom by relating it to the rank of the composite precoding matrix [5']. However, this formulation is not easily interpretable in terms of parameters such as bandwidth and DOA due to the non-trivial composition of individual precoding matrices. Fundamentally this work leverages the OFDM structure of the signal to treat each symbol as an effectively narrowband operation, albeit with varying path losses due to frequency selectivity. An analogous result was derived in [24'], but suffers from the same shortcomings as the previous. Zhu et al. [30'] proposed a unified method of subspace formulation as well as an easily interpretable bound on the number of necessary RF chains from signal parameters. However, the authors explicitly decouple spatial dimensions in their proposed framework, which leads to a drastic overestimation of the signals' degrees of freedom. Furthermore, it does not discuss the effects of high bandwidth on their method or address how it may affect their spatial covariance matrix formulation. In general, the majority of hybrid precoder designs require the number of RF chains to be on the order of the signal's temporal dimension as opposed to the far smaller spatial dimension.

A series of works have focused more directly on the issue of beamforming when the signal has substantial bandwidth leaving the system vulnerable to beam squinting [12]. Chen et al. approaches the problem by coming up with an optimal beam generated from a superposition of clustered steering vectors [11']. This effectively widens the beam such that the squinting effects can be accounted for. The work of Peng et al. follows a similar methodology but generates the widened beam from a family of chirped signals due to their approximately at spectral response [21']. Both of these works treat the solution to broadband beamforming as essentially producing the best wide beam that encompasses all the possible frequencies. This is a fundamentally different approach from the exemplary system and method, which can seek to encode and reconstruct samples of the delayed signal by forming several beams. This notion of reconstructing samples in a more time-domain oriented approach was explored to some degree by Morsali et al [20']. However, this work largely approaches the problem from a signal design perspective. As in previous works, it treats broadband to mean a collection of narrowband beams applied at differing frequencies and fails to generalize to less idealized cases. A common theme in the previously discussed sources is that the goal of many authors is to approximate a true time-delay. The motivation for this is that actually implementing a time-delay system is extremely difficult for a variety of reasons, namely resolution, power consumption, and chip size [13']. Nonetheless, a significant amount of research has been put into true time-delay systems in recent years. Jang et. al designed a baseband true-time delay unit that is meant to be used in conjunction with phase shifters [12']. Though the inclusion of phase shifters reconciles the issues of RF and baseband delays, it adds another level of hardware complexity. The actual time delay operator in this paper is similar to that of Spoof et. al [26]. Both sources utilize a re-sampling technique in which the signal is delayed by varying the clock phase of a modified sampling unit.

Though not nearly as cumbersome as a tapped delay line, this method still requires a significant amount of additional front-end hardware. A consequence of the mathematical model as described herein is that a precise condition can be defined where the narrowband assumption fails. Though this is a minor note in our work and implicitly derived by Buckley, the limits to which a system can handle increased bandwidth is generally not well described.

Zatman sought to answer this question directly by producing a methodology for determining when the rank of the covariance matrix exceeds one [29']. The approach centers around an analysis of when two sinusoids become sufficiently spaced to produce a rank two signal covariance matrix. Our approach hinges on the observation that the received signal is implicitly time-limited by the array, meaning that its covariance matrix will always be full-rank, albeit ill-conditioned to the point where the effective degrees of freedom remain small [23'].

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications as listed below and throughout this document are hereby incorporated by reference in their entirety herein.

[1] I. Ahmed, H. Khammari, A. Shahid, A. Musa, K. S. Kim, E. De Poorter, and I. Moerman. A survey on hybrid beamforming techniques in 5 g: Architecture and system model perspectives. IEEE Communications Surveys Tutorials, 20(4):3060-3097, Fourthquarter 2018.

[2] Ehab Ali, M. Ismail, R. Nordin, and N. F. Abdullah. Beamforming techniques for massive mimo systems in 5 g: overview, classification, and trends for future research. Frontiers of Information Technology & Electronic Engineering, 18:753-772, 2017.

[3] K. Ardah, G. Fodor, Y. C. B. Silva, W. C. Freitas, and F. R. P. Cavalcanti. A unifying design of hybrid beamforming architectures employing phase shifters or switches. IEEE Transactions on Vehicular Technology, 67(11): 11243-11247, 2018.

[4] S. Ashrafi. System and method for communication using prolate spheroidal wave functions, U.S. Pat. No. 10,148,360, December 2018.

[5] O. E. Ayach, S. Rajagopal, S. Abu-Surra, Z. Pi, and R. W. Heath. Spatially sparse precoding in millimeter wave mimo systems. IEEE Transactions on Wireless Communications, 13(3):1499-1513, 2014.

[6] R. Baraniuk, D. Baron, M. Duarte, S. Sarcotham, M. Wakin, and M. Davenport. Method and apparatus for distributed compressed sensing, U.S. Pat. No. 7,511,643, March 2009.

[7] T. E. Bogale, L. B. Le, A. Haghighat, and L. Vandendorpe. On the number of rf chains and phase shifters, and scheduling design with hybrid analog-digital beamforming. IEEE Transactions on Wireless Communications, 15(5):3311-3326, 2016.

[8] R. Chen, H. Xu, C. Li, L. Zhu, and J. Li. Hybrid beamforming for broadband millimeter wave massive mimo systems. In 2018 IEEE 87th Vehicular Technology Conference (VTC Spring), pages 1-5, 2018.

[9] S. Jang, R. Lu, J. Jeong, and M. P. Flynn. A 1-ghz 16-element four-beam true-time-delay digital beamformer. IEEE Journal of Solid-State Circuits, 54(5):1304-1314, 2019.

[10] M. Jung, H. J. Yoon, and B. W. Min. A wideband true-time-delay phase shifter with 100 bandwidth using 28 nm cmos. In 2020 IEEE Radio Frequency Integrated Circuits Symposium (RFIC), pages 59-62, 2020.

[11] A. Morsali and B. Champagne. Achieving fully-digital performance by hybrid analog/digital beamforming in wide-band massive-mimo systems. In ICASSP 2020-2020 IEEE International Conference on Acoustics, Speech and Signal Processing (ICASSP), pages 5125-5129, 2020.

[12] R. Peng and Y. Tian. Robust wide-beam analog beamforming with inaccurate channel angular information. IEEE Communications Letters, 22(3):638-641, 2018.

[13] D. Slepian. Prolate spheroidal wave functions, Fourier analysis, and uncertainty. V—The discrete case. Bell Systems Tech. J., 57(5):1371-1430, 1978.

[14] F. Sohrabi and W. Yu. Hybrid digital and analog beamforming design for large-scale antenna arrays. IEEE Journal of Selected Topics in Signal Processing, 10(3):501-513, 2016.

[15] K. Spoof, V. Unnikrishnan, M. Zahra, K. Stadius, M. Kosunen, and J. Ryynanen. True-time-delay beamforming receiver with rf re-sampling. IEEE Transactions on Circuits and Systems I: Regular Papers, pages 1-13, 2020.

[16] K. Venugopal, A. Alkhateeb, N. Gonzalez Prelcic, and R. W. Heath. Channel estimation for hybrid architecture-based wideband millimeter wave systems. IEEE Journal on Selected Areas in Communications, 35(9):1996-2009, 2017.

[17] M. Zatman. How narrow is narrowband? IEE Proceedings—Radar, Sonar and Navigation, 145(2):85-91, 1998.

[18] D. Zhu, B. Li, and P. Liang. A novel hybrid beamforming algorithm with unified analog beamforming by subspace construction based on partial csi for massive mimo-ofdm systems. IEEE Transactions on Communications, 65(2):594-607, 2017.

SECOND REFERENCE SET

[1'] I. Ahmed, H. Khammari, A. Shahid, A. Musa, K. S. Kim, E. De Poorter, and I. Moerman. A survey on hybrid beamforming techniques in 5 g: Architecture and system model perspectives. IEEE Communications Surveys Tutorials, 20(4):3060-3097, Fourthquarter 2018.

[2'] Ehab Ali, M. Ismail, R. Nordin, and N. F. Abdullah. Beamforming techniques for massive mimo systems in 5 g: overview, classification, and trends for future research. Frontiers of Information Technology & Electronic Engineering, 18:753-772, 2017.

[3'] S. Anderson. Optimal dimension reduction for sensor array signal processing. In Conference Record of the Twenty-Fifth Asilomar Conference on Signals, Systems Computers, pages 918-922 vol. 2, 1991.

[4'] O. E. Ayach, S. Rajagopal, S. Abu-Surra, Z. Pi, and R. W. Heath. Spatially sparse precoding in millimeter wave mimo systems. IEEE Transactions on Wireless Communications, 13(3):1499-1513, 2014.

[5'] T. E. Bogale, L. B. Le, A. Haghighat, and L. Vandendorpe. On the number of rf chains and phase shifters, and scheduling design with hybrid analog-digital beamforming. IEEE Transactions on Wireless Communications, 15(5):3311-3326, 2016.

[6'] Aline Bonami, Philippe Jaming, and Abderrazek Karoui. Non-asymptotic behavior of the spectrum of the sinc-kernel operator and related applications. Journal of Mathematical Physics, 62(3):033511, March 2021.

[7'] M. Boulsane, N. H. Bourguiba, and A. Karoui. Discrete prolate spheroidal wave functions: Further spectral analysis and some related applications, 2019.

[8'] K. Buckley. Spatial/spectral filtering with linearly constrained minimum variance beamformers. IEEE Transactions on Acoustics, Speech, and Signal Processing, 35(3):249-266, 1987.

[9'] K. Buckley and L. Griffiths. Eigenstructure based broadband source location estimation. In ICASSP '86. IEEE International Conference on Acoustics, Speech, and Signal Processing, volume 11, pages 1869-1872, 1986.

[10'] K. M. Buckley and L. J. Griffiths. Broad-band signal-subspace spatial-spectrum (bass-ale) estimation. IEEE Transactions on Acoustics, Speech, and Signal Processing, 36(7):953-964, 1988.

[11'] R. Chen, H. Xu, C. Li, L. Zhu, and J. Li. Hybrid beamforming for broadband millimeter wave massive mimo systems. In 2018 IEEE 87th Vehicular Technology Conference (VTC Spring), pages 1-5, 2018.

[12'] S. Jang, R. Lu, J. Jeong, and M. P. Flynn. A 1-ghz 16-element four-beam true-time-delay digital beamformer. IEEE Journal of Solid-State Circuits, 54(5):1304-1314, 2019.

[13'] M. Jung, H. J. Yoon, and B. W. Min. A wideband true-time-delay phase shifter with 100 bandwidth using 28 nm cmos. In 2020 IEEE Radio Frequency Integrated Circuits Symposium (RFIC), pages 59-62, 2020.

[14'] Santhosh Karnik, Justin Romberg, and Mark A. Davenport. Improved bounds for the eigenvalues of prolate spheroidal wave functions and discrete prolate spheroidal sequences, 2020.

[15'] Santhosh Karnik, Justin K. Romberg, and Mark A. Davenport. Bandlimited signal reconstruction from nonuniform samples. 2019.

[16'] Santhosh Karnik, Zhihui Zhu, Michael B. Wakin, Justin Romberg, and Mark A. Davenport. The fast slepian transform, 2017.

[17'] Jens Keiner, Stefan Kunis, and Daniel Potts. Using n t 31a software library for various nonequispaced fast fourier transforms. ACM Transactions on Mathematical Software, 36(4):19, 2009.

[18'] H. Krim and M. Viberg. Two decades of array signal processing research: the parametric approach. IEEE Signal Processing Magazine, 13(4):67-94, 1996.

[19'] Dian Mo and Marco F. Duarte. Design of spectrally shaped binary sequences via randomized convex relaxations. In 2015 49th Asilomar Conference on Signals, Systems and Computers, pages 164-168, 2015.

[20'] A. Morsali and B. Champagne. Achieving fully-digital performance by hybrid analog/digital beamforming in wide-band massive-mimo systems. In ICASSP 2020-2020 IEEE International Conference on Acoustics, Speech and Signal Processing (ICASSP), pages 5125-5129, 2020.

[21'] R. Peng and Y. Tian. Robust wide-beam analog beamforming with inaccurate channel angular information. IEEE Communications Letters, 22(3):638-641, 2018.

[22'] D. Slepian. On bandwidth. Proceedings of the IEEE, 64(3):292-300, 1976.

[23'] D. Slepian. Prolate spheroidal wave functions, Fourier analysis, and uncertainty. V—The discrete case. Bell Systems Tech. J., 57(5):1371-1430, 1978.

[24'] F. Sohrabi and W. Yu. Hybrid digital and analog beamforming design for large-scale antenna arrays. IEEE Journal of Selected Topics in Signal Processing, 10(3):501-513, 2016.

[25'] D. Spielman, A. Paulraj, and T. Kailath. Performance analysis of the music algorithm. In ICASSP '86. IEEE International Conference on Acoustics, Speech, and Signal Processing, volume 11, pages 1909-1912, 1986.

[26'] K. Spoof, V. Unnikrishnan, M. Zahra, K. Stadius, M. Kosunen, and J. Ryyn-anen. True-time-delay beamforming receiver with rf re-sampling. IEEE Transactions on Circuits and Systems I: Regular Papers, pages 1-13, 2020.

[27'] K. Venugopal, A. Alkhateeb, N. Gonzalez Prelcic, and R. W. Heath. Channel estimation for hybrid architecture-based wideband millimeter wave systems. IEEE Journal on Selected Areas in Communications, 35(9):1996-2009, 2017.

[28'] X. L. Xu and K. M. Buckley. Reduced-dimension beam-space broad-band source localization: preprocessor design and evaluation. In Fourth Annual ASSP Workshop on Spectrum Estimation and Modeling, pages 22-27, 1988.

[29'] M. Zatman. How narrow is narrowband? IEE Proceedings—Radar, Sonar and Navigation, 145(2):85-91, 1998.

[30'] D. Zhu, B. Li, and P. Liang. A novel hybrid beamforming algorithm with unified analog beamforming by subspace construction based on partial csi for massive mimo-ofdm systems. IEEE Transactions on Communications, 65(2):594-607, 2017.

What is claimed is:

1. A system comprising:

a broadband receiver comprising an array of beamforming receiving elements, wherein the array of beamforming receiving elements is configured to receive a plane wave to provide a plurality of input signals corresponding to a number of receiving elements of the array;

a demodulation unit coupled to the broadband receiver, the demodulation unit comprising a plurality of measurement modules, including a first measurement module and a second measurement module, wherein each module is coupled to one or more receiving elements of the array to receive corresponding input signals, wherein the first measurement module and a second measurement module respectively defines an aperture of the array at a first projection and a second projection of the plane wave and includes a set of phase and magnitude varying elements configured to apply an effective complex weight associated with the projection; and a set of combiner units, including a first combiner unit and a second combiner unit, wherein each of the set of combiner units is coupled to outputs of a respective module of the plurality of measurement modules, and wherein the first combiner unit is coupled to outputs of the first measurement module and the second combiner unit is coupled to outputs of the second measurement module.

2. The system of claim 1, further comprising:

a set of analog-to-digital converters, wherein the number of the plurality of measurement modules corresponds to the number of the set of analog-to-digital converters, and wherein the number of analog-to-digital converters is less than the number of receiving elements of the array.

3. The system of claim 1, wherein the first measurement module is successively coupled to the second measurement module.

4. The system of claim 1, wherein the first measurement module and the second measurement module are coupled to one another in a parallel configuration.

5. The system of claim 1, wherein the first measurement module is coupled to each of the receiving elements of the array.

6. The system of claim 1, wherein the first measurement module is coupled to a subset of the receiving elements of the array.

7. The system of claim 1, wherein outputs of the set of combiner units are operatively coupled to a respective analog-to-digital converter, wherein a first output of the first combiner unit is coupled to a first analog-to-digital converter and a second output of the second combiner unit is coupled to a second analog-to-digital converter.

8. The system of claim 1, wherein the set of the phase and magnitude varying elements applies the effective complex weight associated with the projection using modulation weights derived from sampled prolate spheroidal wave functions.

9. The system of claim 1, wherein the set of the phase and magnitude varying elements applies the effective complex weight associated with the projection using modulation weights that are unimodular or are restricted to be members of a set with finite cardinality.

10. The system of claim 1, wherein the array of beamforming receiving elements is configured as a 2D or a 3D array.

11. The system of claim 1, wherein the elements of the array are disposed on a conformal 3D structure.

12. The system of claim 1, wherein the elements of the array are configured in a grid pattern, a circular or oval-shaped pattern, or an unstructured pattern.

13. The system of claim 1, wherein the first combiner unit comprises a weighted summing circuit that connects to outputs of the first set of phase and magnitude varying elements.

14. The system of claim 1, wherein the set of the phase and magnitude varying elements comprises at least one of a phase shifter circuit, a polarity inverter circuit, or an amplifier circuit.

15. The system of claim 1, further comprising:

a processor coupled to outputs of the set of combiner units to receive sampled ADC values, wherein the processor is configured to reconstruct a transmitted signal using the sampled ADC values.

16. The system of claim 15, wherein the set of combiner units is configured to temporally sample values at a decimation rate prior to reconstructing the transmitted signal, wherein the temporally sampled values have a fixed or variable sampling rate lower than the Nyquist rate.

17. The system of claim 15, wherein the processor is configured to perform fast Slepian computation to reconstruct the transmitted signal.

18. The system of claim 2, further comprising:

a processor coupled to outputs of the set of analog-to-digital converters to receive sampled ADC values, wherein the processor is configured to determine a direction of arrival (DOA) of the plane wave using the sampled ADC values.

19. The system of claim 2, further comprising:

a processor coupled to outputs of the set of analog-to-digital converters to receive sampled ADC values, wherein the processor is configured to classify a signal type of a transmitted bandlimited signal using the sampled ADC values.

20. The system of claim 2, further comprising:

a processor coupled to outputs of the set of analog-to-digital converters to receive sampled ADC values, wherein the processor is configured to decode communication symbols encoded in a transmitted bandlimited signal using the sampled ADC values.

21. A system comprising:

a broadband transmitter comprising an array of beamforming transmitting elements, wherein the array of beamforming transmitting elements is configured to receive a plurality of signals corresponding to a number of transmitting elements to transmit a plane wave;

a low-dimensional encoding broadband beamformer unit, the low-dimensional encoding broadband beamformer unit being coupled to the broadband transmitter, the low-dimensional encoding broadband beamformer unit comprising a plurality of beamforming modules, including a first beamforming module and a second beamforming module, wherein each beamforming module is configured to create a projection of the plane wave and includes a phase and magnitude varying elements to apply an effective complex weight associated with the projection, and wherein the set of the phase and magnitude varying elements are coupled to each transmitting element of the array of beamforming transmitting elements; and a plurality of digital-to-analog converters, each coupled to each beamforming module of the plurality of beamforming modules.

22. A method comprising:

receiving a low-dimensional encoded broadband signal as a plane wave at a broadband array receiver comprising an array of beamforming receiving elements, wherein the array is configured to provide a plurality of input signals corresponding to the array of beamforming receiving elements;

decoding the plurality input signals at a demodulation unit coupled to the broadband array receiver, the demodulation unit comprising a plurality of measurement modules, including a first measurement module and a second measurement module, each module is coupled to one or more receiving elements of the array, wherein the first measurement module and the second measurement module defines an aperture of the array at a respective first projection and second projection of the plane wave and includes a set of phase and magnitude varying elements configured to apply different effective complex weights to the input signals, wherein the complex weights at each measurement module are associated with a given projection of the plane wave as incident on the broadband array, combining outputs of a respective module of the plurality of measurement modules at a set of combiner units, wherein the set of combiner units, including a first combiner unit and a second combiner unit, is coupled to outputs of a respective module of the plurality of measurement modules, wherein the first combiner unit is coupled to outputs of the first measurement module and the second combiner unit is coupled to outputs of the second measurement module; and reconstructing, via a processor, a source signal based on the decoding.

23. The method of claim 22, wherein the reconstruction of the source signal comprises:

combining, using a respective combiner unit in a set of combiner units, outputs of each measurement module;

sampling, using a set of analog-to-digital converters (ADC), the combined outputs into sampled ADC values; and reconstructing the source signal using sampled ADC values, wherein the processor is coupled to outputs of the analog-to-digital converters.

24. The method of claim 22, wherein the input signals comprise spatially sampled signals.

25. The system of claim 21, wherein each beamforming module is configured to encode a coefficient channel associated with a measurement basis function.

26. The system of claim 25, wherein the measurement basis function is associated with a set of prolate spheroidal wave functions, a set of DFT functions, or a set of binary functions.

27. The system of claim 21, wherein the number of the plurality of beamforming modules corresponds to the number of the plurality of digital-to-analog converters, and wherein the number of the plurality of digital-to-analog converters is less than the number of transmitting elements of the array.

* * * * *